(12) United States Patent
Lee

(10) Patent No.: US 11,639,899 B2
(45) Date of Patent: May 2, 2023

(54) LIGHTING APPARATUS FOR EMITTING UNIFORM LIGHT

(71) Applicant: M-Vision Co., Ltd., Chungcheongbuk-do (KR)

(72) Inventor: Guyoul Lee, Chungcheongbuk-do (KR)

(73) Assignee: M-Vision Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 17/402,039

(22) Filed: Aug. 13, 2021

(65) Prior Publication Data

US 2022/0228721 A1    Jul. 21, 2022

(30) Foreign Application Priority Data

Jan. 20, 2021  (KR) .......................... 10-2021-0008154

(51) Int. Cl.
*G01N 21/88* (2006.01)
*F21V 7/00* (2006.01)
(Continued)

(52) U.S. Cl.
CPC ....... *G01N 21/8806* (2013.01); *F21V 7/0066* (2013.01); *F21V 7/041* (2013.01);
(Continued)

(58) Field of Classification Search
CPC .......... F21V 3/02; F21V 7/0066; F21V 7/045; F21V 23/005; G03B 15/06;
(Continued)

(56) References Cited

U.S. PATENT DOCUMENTS 7,854,475 B2    12/2010  Ito et al.
10,585,333 B1 *  3/2020  Hardy ................... G03B 15/02
(Continued)

FOREIGN PATENT DOCUMENTS

CN    113466259 A  * 10/2021
EP      1548396 A1 *  6/2005  ......... G01N 21/8806
(Continued)

*Primary Examiner* — Alan B Cariaso
(74) *Attorney, Agent, or Firm* — Hoffmann & Baron, LLP

(57) ABSTRACT

The present disclosure relates to a lighting apparatus. A lighting apparatus according to an embodiment of the present disclosure includes: a dome structure including a first opening opened in a circular or polygonal shape at least partially in one surface thereof, and a second opening opened in a circular or polygonal shape at least partially in the other surface so as to be larger than the first opening; a plurality of reflective plates configured to connect one line the first opening and one line of the second opening; a PCB provided in the dome structure and disposed at a predetermined first angle based on a region of the other surface that excludes the second opening in the other surface of the dome structure; and a light source disposed on the PCB, in which light outputted at the first angle from the inside of the dome structure through the light source is reflected through at least one of the plurality of reflective plates, and the reflected light is emitted through the second opening to an object disposed at a lower end of the second opening and spaced apart from the dome structure.

8 Claims, 23 Drawing Sheets

(51) Int. Cl.
　　*F21V 7/04*　　　　(2006.01)
　　*F21V 7/05*　　　　(2006.01)
　　*G03B 15/06*　　　(2021.01)
　　*G01N 21/95*　　　(2006.01)
　　*F21Y 115/10*　　　(2016.01)
　　*F21V 3/02*　　　　(2006.01)
　　*F21V 23/00*　　　(2015.01)

(52) U.S. Cl.
　　CPC ........... *F21V 7/05* (2013.01); *G01N 21/8851* (2013.01); *G01N 21/95* (2013.01); *G03B 15/06* (2013.01); *F21V 3/02* (2013.01); *F21V 7/045* (2013.01); *F21V 23/005* (2013.01); *F21Y 2115/10* (2016.08); *G01N 2021/8816* (2013.01)

(58) Field of Classification Search
　　CPC ....... G01N 21/8806; G01N 2021/8812; G01N 2021/8816; G01N 21/8851; G01N 21/95; G02B 21/082; G02B 21/084
　　See application file for complete search history.

(56)　　　　References Cited

U.S. PATENT DOCUMENTS

2009/0127890 A1　　5/2009　Ito et al.
2010/0246174 A1*　9/2010　Ido ..................... G01N 21/8806
　　　　　　　　　　　　　　　　　　　　　362/235

FOREIGN PATENT DOCUMENTS

| JP | 2009-120032 A | 6/2009 | |
| JP | 5128260 B2 | 11/2012 | |
| KR | 101474191 B1 * | 12/2014 | |
| KR | 20200007292 A * | 1/2020 | |
| WO | WO-2017160236 A1 * | 9/2017 | ............ F21V 7/0025 |

\* cited by examiner

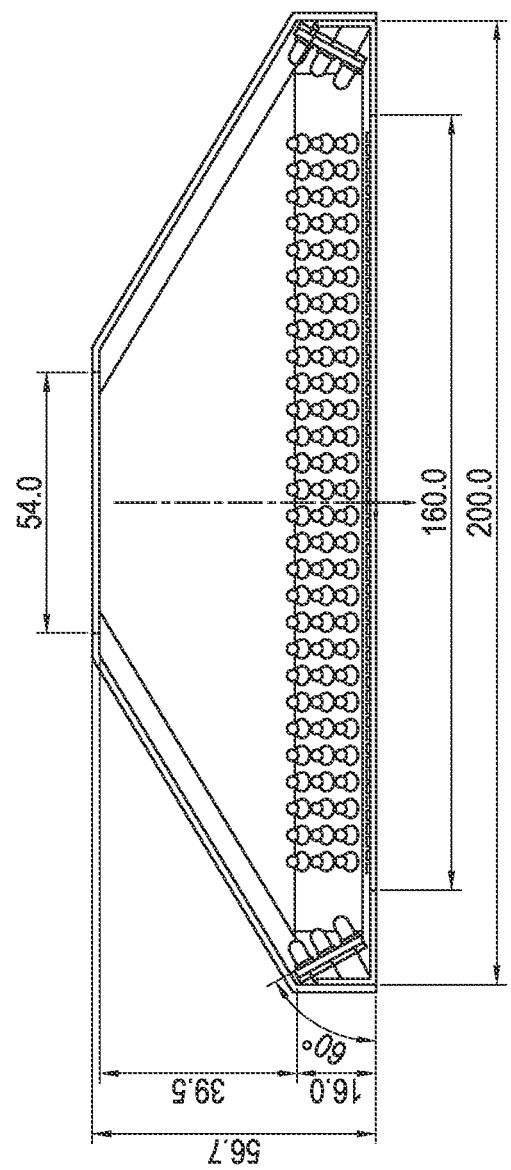
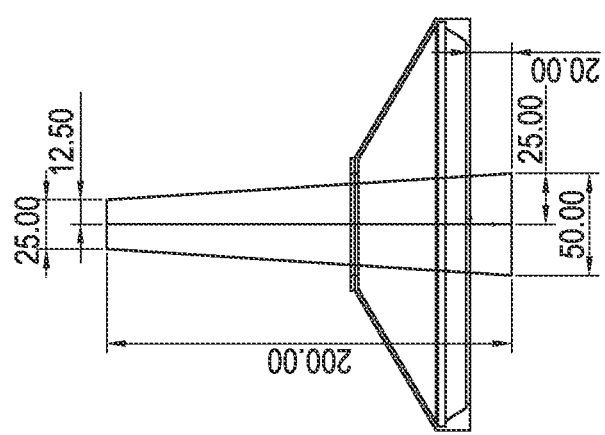
FIG. 5B
FIG. 5A

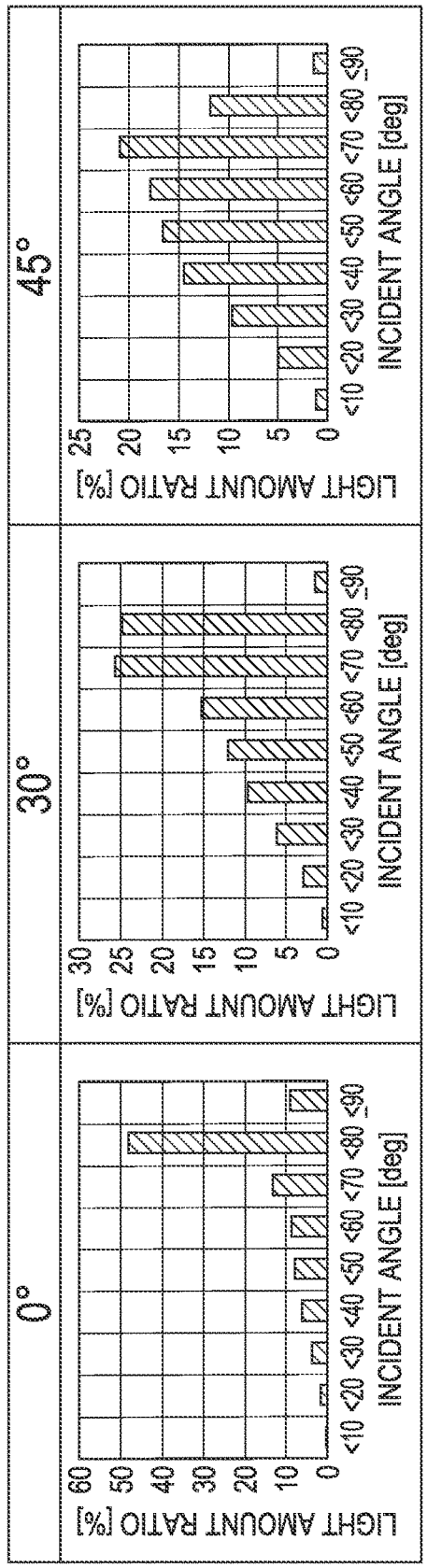
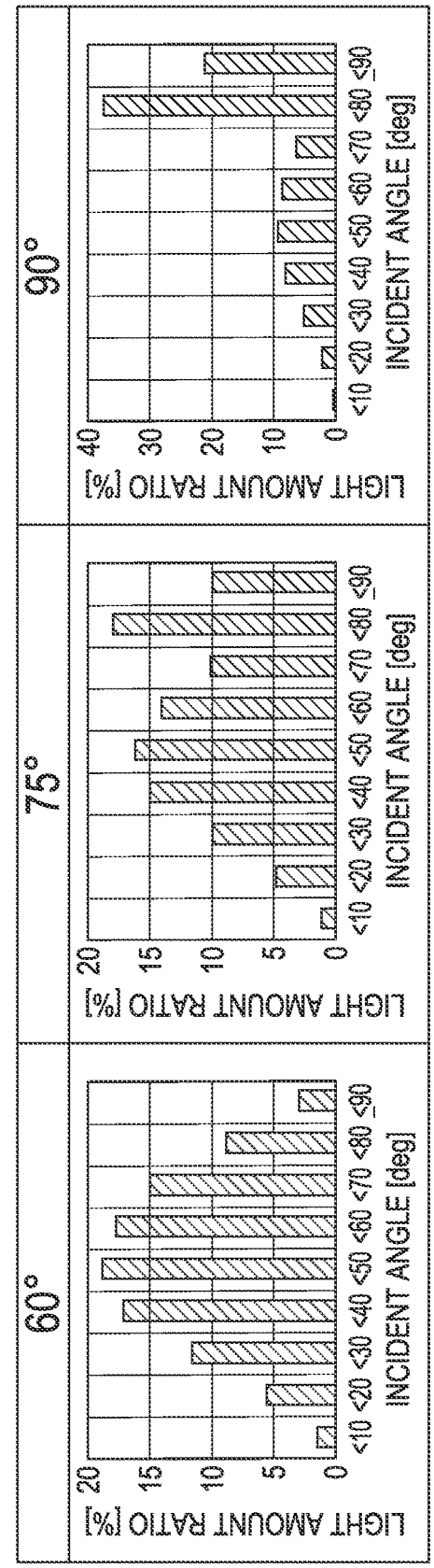
FIG. 11A FIG. 11B FIG. 11C FIG. 11D FIG. 11E FIG. 11F

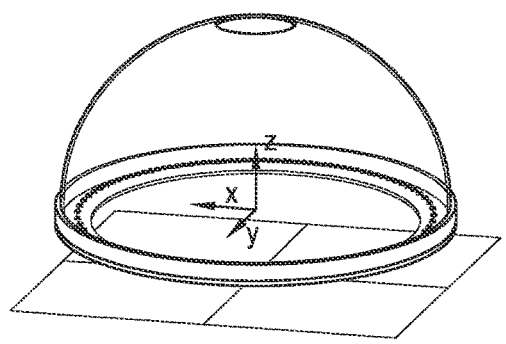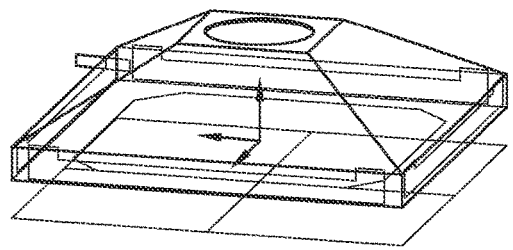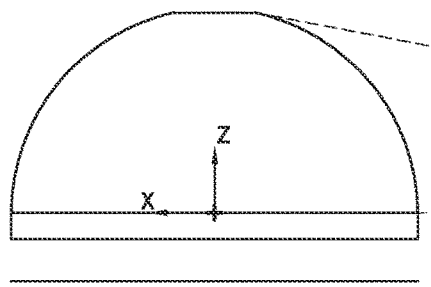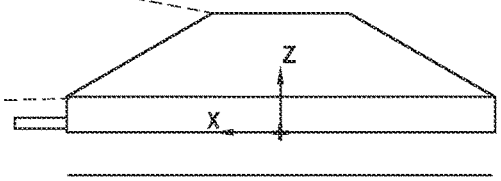
FIG. 15A                    FIG. 15B

| LIGHTING TYPE / FIELD OF VIEW | DOME LIGHTING IN RELATED ART | EXAMPLE OF PRESENT DISCLOSURE |
|---|---|---|
| 50mm x 50mm | 97.2% | 98.4% |
| 100mm x 100mm | 79.2% | 92.4% |

FIG. 19

LIGHTING APPARATUS FOR EMITTING UNIFORM LIGHT

CROSS-REFERENCE TO RELATED APPLICATIONS

This application claims the priority of Korean Patent Application No. 10-2021-0008154 filed on Jan. 20, 2021, in the Korean Intellectual Property Office, the disclosure of which is incorporated herein by reference.

BACKGROUND

Field

The present disclosure relates to a lighting apparatus, and more particularly, to a lighting apparatus capable of emitting uniform light without shadow to provide soft dome lighting, having lightweight, compact, and thin design that saves a space, and obtaining a bright and clear image with a member of a light guide plate even though the dome lighting has a larger size than flat dome lighting.

Description of the Related Art

In general, dome lighting is implemented by emitting uniform light at various angles using a dome-shaped lighting reflective plate. LED light is reflected in a hemispheric dome, such that soft and uniform light is emitted, and a test target is irradiated with the light.

The dome lighting is suitable for inspection of a product with a large amount of reflection and scattering, inspection of a curved or undulate surface, and inspection of detection of a uniform image of a rounded test target.

However, the dome lighting has a problem in that there occurs a zone (dark zone), in which an influence of light is decreased due to a size of a lighting hole (opening), and the dome lighting occupies a large space because the dome lighting has a larger volume than other types of lighting.

In addition, when a test target has a larger size, coaxial lighting is sometimes added to supplement image brightness.

Meanwhile, flat dome lighting, which is another type of lighting, is implemented by emitting uniform diffuse light by controlling diffusion and transmission of the lighting light by means of a special pattern (dots or stripes) on a surface of a light guide plate. The flat dome lighting is implemented by lightweight, compact, and thin design, which makes it possible to save a space.

However, the flat dome lighting has a problem in that foreign substances included in a light guide diffusion plate cause light-emitting spots, and a pattern of the light guide plate may be visible, which degrades the quality of images.

Therefore, there is an increasing need for a lighting apparatus capable of emitting uniform light without shadow to provide soft dome lighting, having lightweight compact, and thin design that saves a space, and obtaining a bright and clear image with a member of a light guide plate even though the dome lighting has a larger size than flat dome lighting.

DOCUMENTS OF RELATED ART

Patent Documents

1. Japanese Patent Application No. JP 2009-142765
2. Japanese Patent Application No. JP 2009-120032

SUMMARY

The present disclosure has been made in an effort to provide a lighting apparatus capable of solving the above-mentioned problems in the related art.

Specifically, the present disclosure provides a lighting apparatus capable of emitting uniform light without shadow to provide soft dome lighting, having lightweight compact, and thin design that saves a space, and obtaining a bright and clear image with a member of a light guide plate even though the dome lighting has a larger size than flat dome lighting.

Meanwhile, technical problems to be solved by the present disclosure are not limited to the above-mentioned technical problems, and other technical problems, which are not mentioned above, may be clearly understood from the following descriptions by those skilled in the art to which the present disclosure pertains.

An embodiment of the present disclosure provides a lighting apparatus including: a dome structure including a first opening opened in a circular or polygonal shape at least partially in one surface thereof, and a second opening opened in a circular or polygonal shape at least partially in the other surface so as to be larger than the first opening; a plurality of reflective plates configured to connect one line the first opening and one line of the second opening; a PCB provided in the dome structure and disposed at a predetermined first angle based on a region of the other surface that excludes the second opening in the other surface of the dome structure; and a light source disposed on the PCB, in which light outputted at the first angle from the inside of the dome structure through the light source is reflected through at least one of the plurality of reflective plates, and the reflected light is emitted through the second opening to an object disposed at a lower end of the second opening and spaced apart from the dome structure.

In addition, a camera, which is disposed at an upper end of the first opening and spaced apart from the dome structure, may capture an image of the object through the first opening and the second opening based on the light emitted to the object.

In addition, the first opening and the second opening may each have a circular or polygonal shape, and the plurality of reflective plates constitutes four flat surfaces.

In addition, the light reflected by at least one of the plurality of reflective plates may have a Lambertian shape.

In addition, the first angle may be 90 degrees or less, uniformity and a light amount of the light emitted to the object may increase in proportion to an increase in size of the first angle and an increase in height of each of the plurality of reflective plates, and a size of the other surface of the dome structure may be inversely proportional to uniformity of the light emitted to the object.

In addition, the first angle may be 55 degrees to 65 degrees.

In addition, a height of each of the plurality of reflective plates and a height of the PCB may be proportional to the light amount of the light emitted to the object, and a size of the other surface of the dome structure may be inversely proportional to uniformity of the light emitted to the object.

In addition, a height of each of the plurality of reflective plates may be proportional to the uniformity of the light emitted to the object until the height of each of the plurality of reflective plates reaches a predetermined reference, and the height of each of the plurality of reflective plates may be inversely proportional to when the height of each of the plurality of reflective plates exceeds the predetermined reference.

In addition, a predetermined reference may indicate that a height of each of the plurality of reflective plates is 80 mm when a size of the other surface of the dome structure is 400 mm and the first angle is 60 degrees.

In addition, a height of each of the plurality of reflective plates may be 30% or less of a size of the other surface of the dome structure.

In addition, the lighting apparatus additionally may use at least one of coaxial lighting, ring lighting, and bar lighting depending on the type of object.

In addition, when the light with the same uniformity and light amount is emitted to the object through the lighting apparatus and a closed dome structure excluding the first opening and the second opening, a height of each of the plurality of reflective plates of the lighting apparatus may be smaller than a height of the reflective plate of the dome structure.

As described above, the lighting apparatus according to the present disclosure is capable of emitting uniform light without shadow to provide soft dome lighting, having lightweight compact, and thin design that saves a space, and obtaining a bright and clear image with a member of a light guide plate even though the dome lighting has a larger size than flat dome lighting.

Therefore, the present disclosure may solve the problem of the dome lighting that there occurs a zone (dark zone), in which an influence of light is decreased due to a size of a lighting hole (opening), and the dome lighting occupies a large space because the dome lighting has a larger volume than other types of lighting.

In addition, the present disclosure may solve the problem of the flat dome lighting that foreign substances included in a light guide diffusion plate cause light-emitting spots, and a pattern of the light guide plate may be visible, which degrades the quality of images.

In addition, the present disclosure may be combined with coaxial lighting, ring lighting, bar lighting, and the like and used in accordance with a test target.

Meanwhile, the effects obtained by the present disclosure are not limited to the aforementioned effects, and other effects, which are not mentioned above, will be clearly understood by those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 5A and 5B are views illustrating an optimized example of the lighting apparatus illustrated in FIGS. 4A and 4B;

FIGS. 11A to 11F are graphs illustrating light amount ratios with respect to incident angles for respective PCB angles related to the present disclosure;

FIGS. 15A and 15B are views illustrating an example that structurally compares the dome lighting in the related art and the lighting provided by the present disclosure;

FIG. 19 is a view illustrating an example of light distribution with respect to the lighting size and the field of view related to the present disclosure when a PCB angle is 60 degrees and a reflective plate height is 30% of the lighting size.

DETAILED DESCRIPTION OF THE EMBODIMENT

Problem in Related Art

In general, dome lighting is implemented by emitting uniform light at various angles using a dome-shaped lighting reflective plate. LED light is reflected in a hemispheric dome, such that soft and uniform light is emitted, and a test target is irradiated with the light.

The dome lighting is suitable for inspection of a product that creates a large amount of reflection and scattering, inspection of a curved or undulate surface, and inspection of detection of a uniform image of a rounded test target.

Figure 1A:
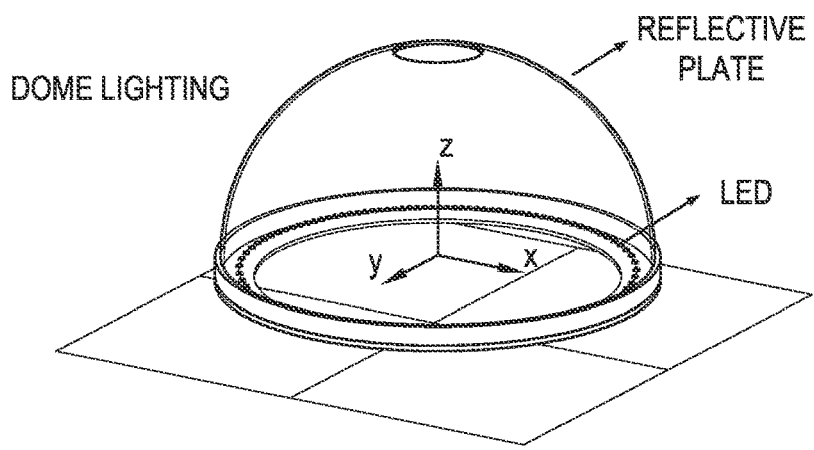
FIGS. 1A to 1O are views illustrating a structure of dome lighting in the related art.
Figure 1B:
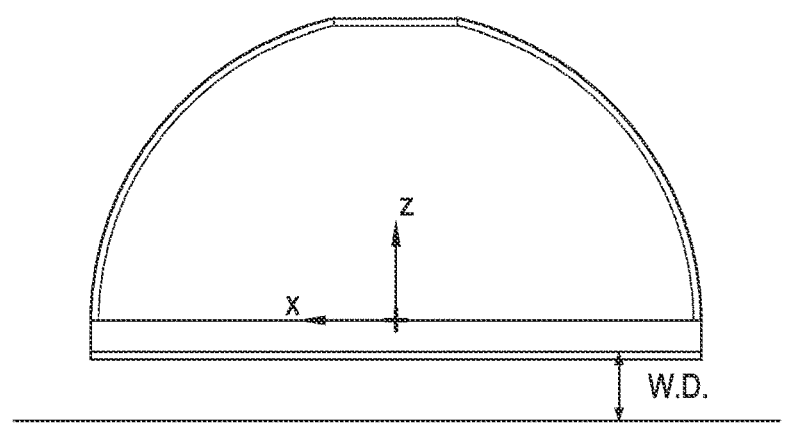
Figure 1C:
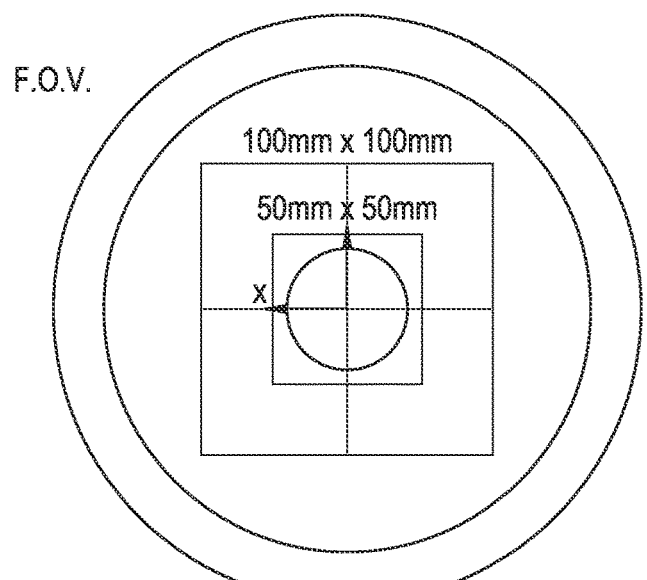

FIGS. 1A to 1C are views illustrating a structure of dome lighting in the related art.

Referring to FIGS. 1A to 1C, a working distance (W.D.) and a field of view (F.O.V.) can be ascertained.

Examples of lighting utilized industrially may include dome lighting, coaxial lighting, flat dome lighting, and the like.

Figure 2A:
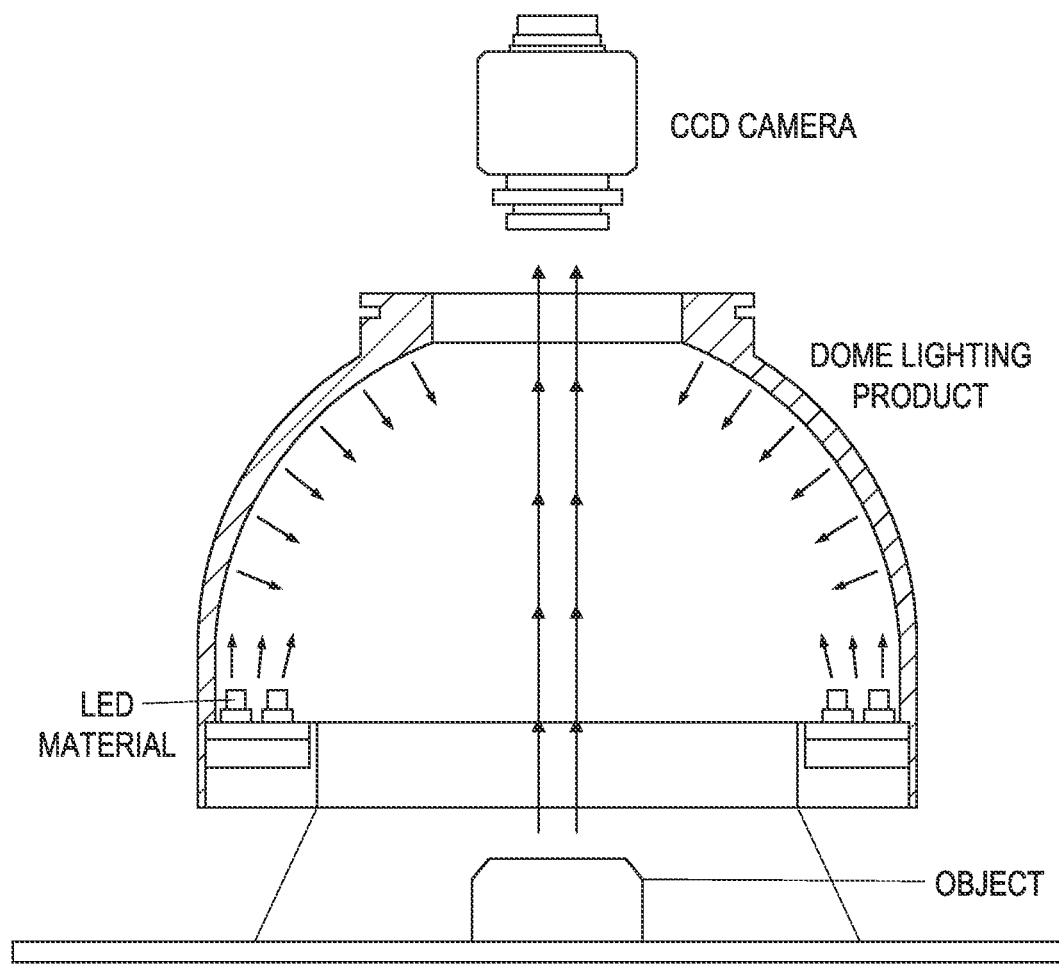
FIG. 2A is a view illustrating dome lighting in the related art.
Figure 2B:
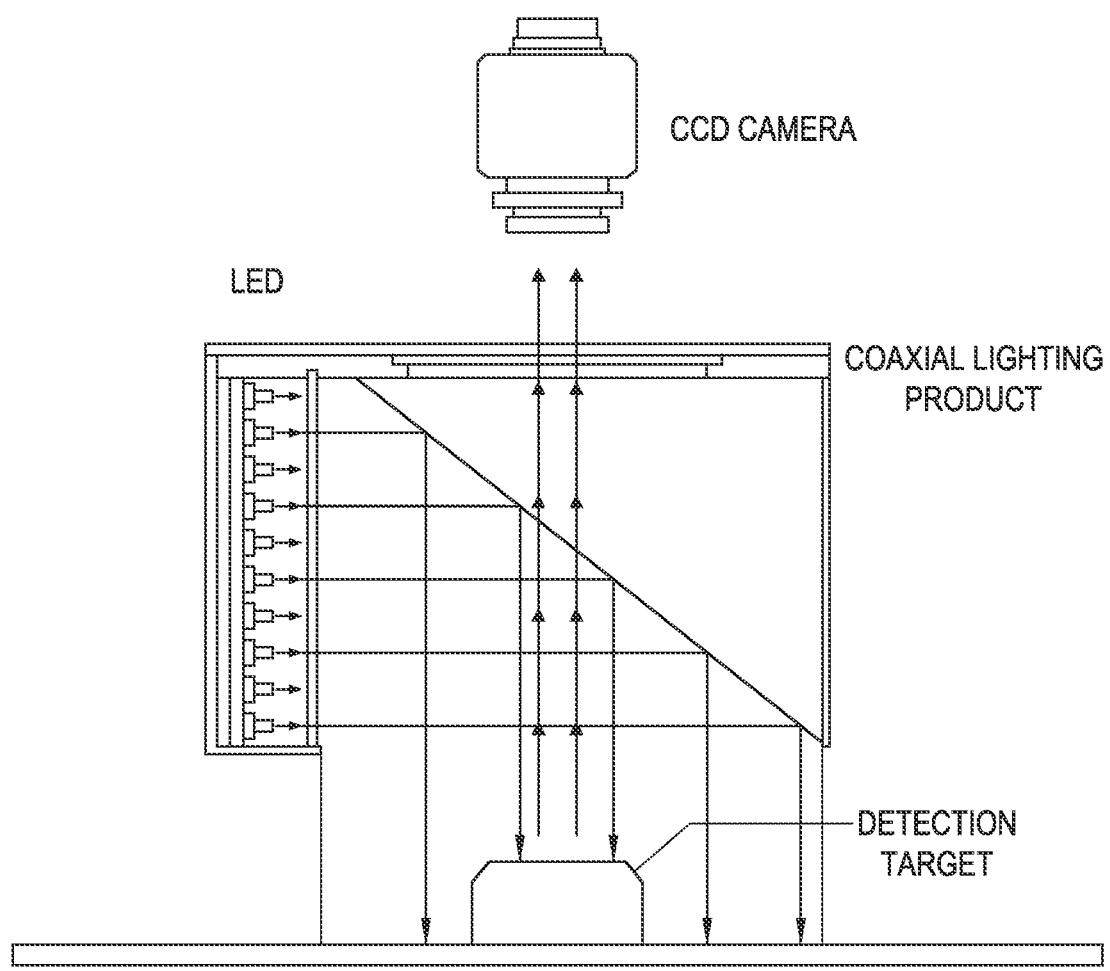
FIG. 2B is a view illustrating coaxial lighting in the related art.
Figure 2C:
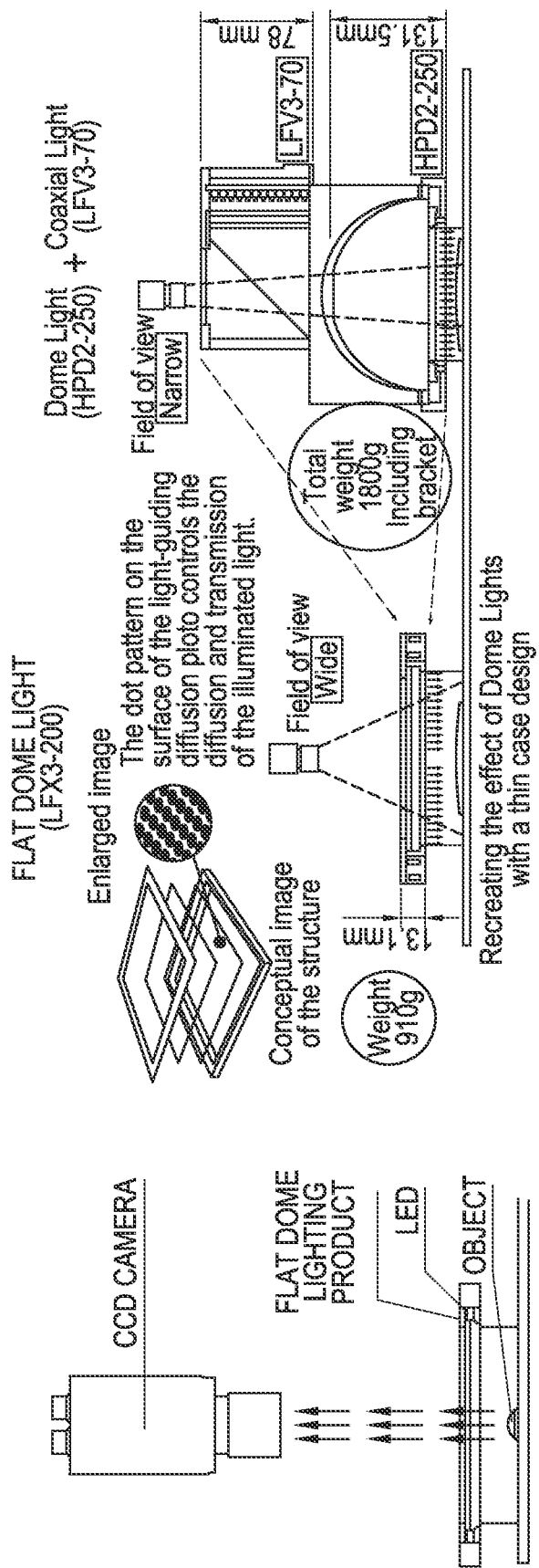
FIG. 2C is a view illustrating an example of flat dome lighting in the related art.

FIG. 2A is a view illustrating dome lighting in the related art; FIG. 2B is a view illustrating coaxial lighting in the related art; FIG. 2C is a view illustrating an example of flat dome lighting in the related art.

Referring to FIG. 2A, dome lighting irradiates a test target with light by emitting soft and uniform light made by reflecting LED light in a hemispheric dome.

The dome lighting emits soft uniform light without shadow and is suitable for inspection of a product that creates a large amount of reflection and scattering. The dome lighting is utilized for inspection of letters on a mirror surface of a body such as glass, inspection of a curved or undulate surface, and detection of a uniform image of a rounded test target.

However, the dome lighting has a problem in that there occurs a zone (dark zone), in which an influence of light is decreased due to a size of a lighting hole (opening), and the dome lighting occupies a large space because the dome lighting has a larger volume than other types of lighting.

Next, referring to FIG. 2B, coaxial lighting is implemented by a camera lens and an optical path of the lighting which are disposed on the same axis. Only 25% of the light is transmitted to a camera through a half mirror.

The coaxial lighting is suitable for a target object with high surface roughness or high reflectance and may acquire images with high quality by combining ring lighting or dome lighting at a lower end of the lighting. Therefore, the coaxial lighting is often used to inspect whether surfaces of glass, liquid crystals, films, PCBs, components, and products have an abnormality.

In addition, referring to FIG. 2C, flat dome lighting reproduces properties of a combination of the dome lighting and the coaxial lighting using a special pattern (dots or stripes). A pattern on a surface of a light guide plate controls diffusion and transmission of the lighting light, thereby implementing emission of uniform and diffuse light without a dark zone.

The flat dome lighting has lightweight, compact, and thin design that saves a space. The dome lighting uses additional coaxial lighting to cope with a situation in which image brightness decreases when the test target is large.

The flat dome lighting may acquire a bright image without adding lighting and thus be utilized for packaging materials with high gloss, metal surface, recognition of printing letters, three-dimensional products, external appearances of electronic components, and contamination of transparent films.

However, the flat dome lighting has a problem in that foreign substances included in a light guide diffusion plate cause light-emitting spots, and a pattern of the light guide plate may be visible, which degrades the quality of images.

Figures 3A, 3B:
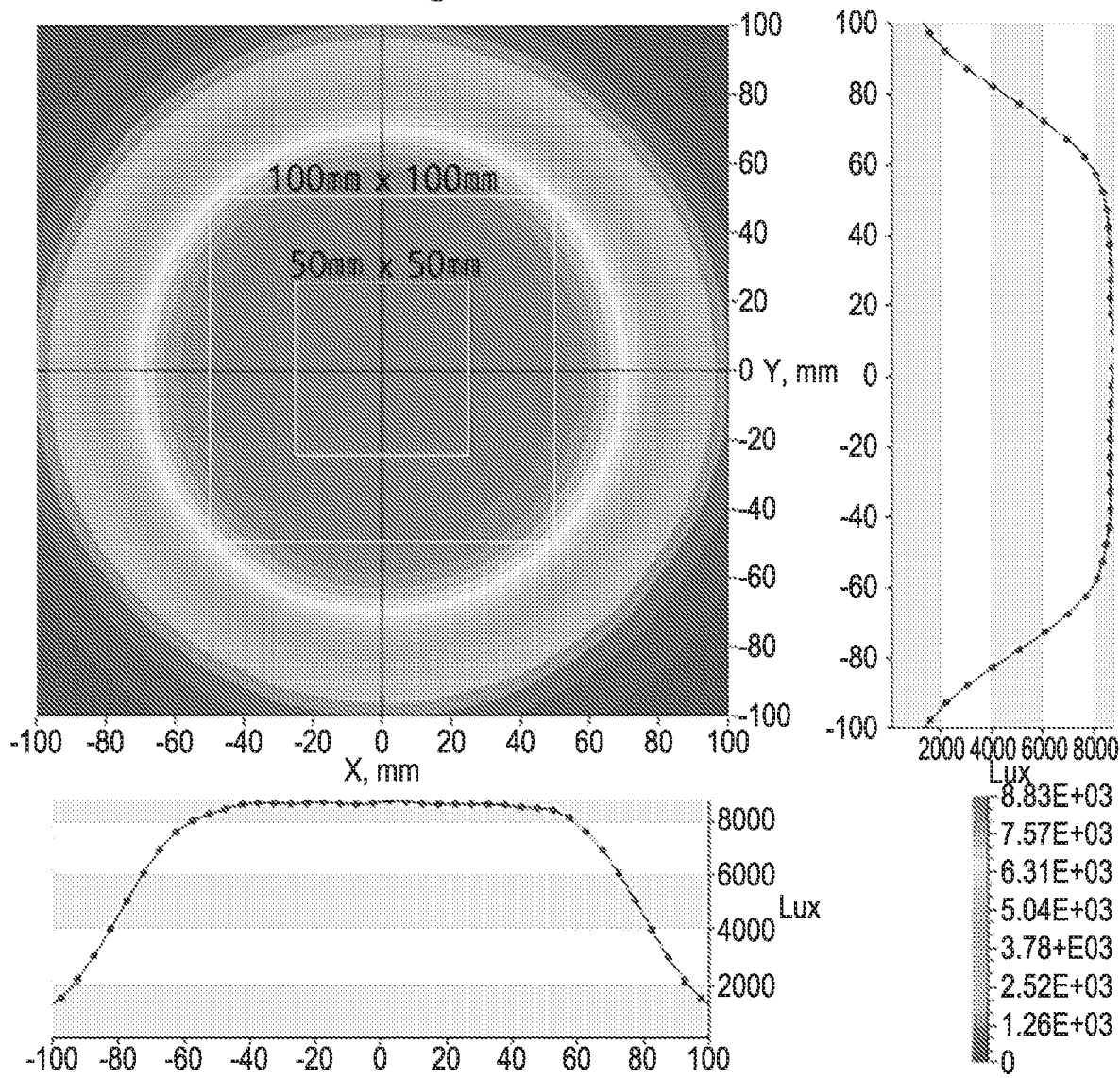
FIGS. 3A to 3C are views illustrating optical properties of dome lighting in the related art.
Figure 3C:
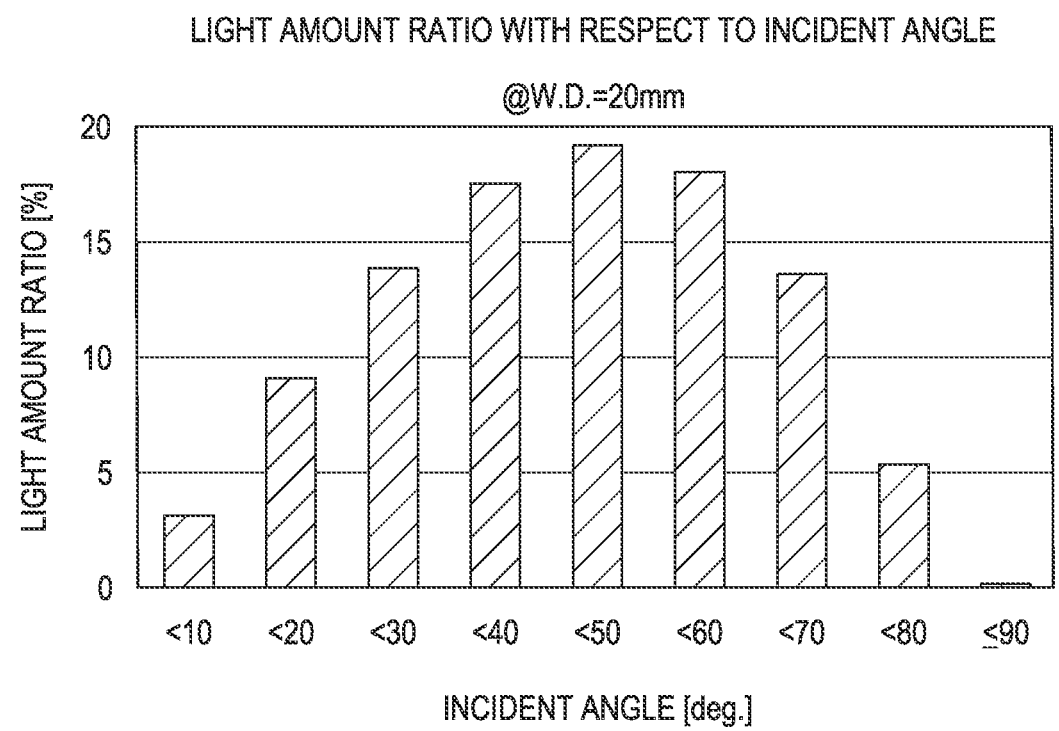

FIGS. 3A, 3B, and 3C illustrate a result of a simulation performed to recognize optical properties of the dome lighting in the related art on the assumption that the lighting size is 200 mm.

Referring to FIGS. 3A, 3B, and 3C, the uniformity varies depending on the working distance (W.D.) and the field of view (F.O.V.).

FIG. 3B illustrates light distribution at a position of the test target. FIG. 3C illustrates a light amount ratio with respect to an incident angle. It can be ascertained that soft and uniform light is emitted as the light amount ratio with respect to the incident angle has distribution similar to the normal distribution.

Therefore, there is an increasing need for a lighting apparatus capable of emitting uniform light without shadow to provide soft dome lighting, having lightweight compact, and thin design that saves a space, and obtaining a bright and clear image with a member of a light guide plate even though the dome lighting has a larger size than flat dome lighting.

Lighting Apparatus Provided by Present Disclosure

The present disclosure has been made in an effort to provide a lighting apparatus capable of solving the above-mentioned problems in the related art.

Specifically, the present disclosure provides a lighting apparatus capable of emitting uniform light without shadow to provide soft dome lighting, having lightweight compact, and thin design that saves a space, and obtaining a bright and clear image with a member of a light guide plate even though the dome lighting has a larger size than flat dome lighting.

Figure 4A:
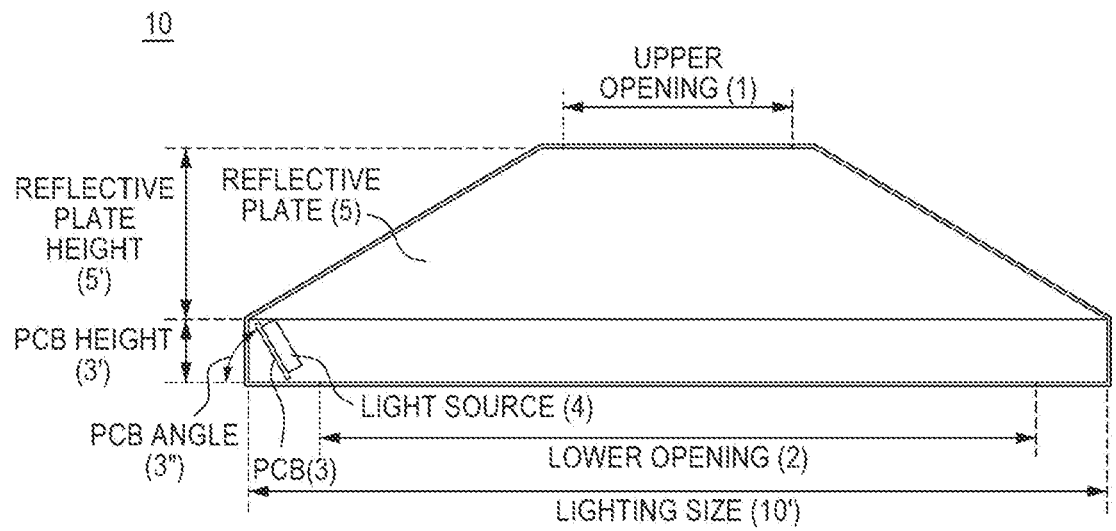
FIGS. 4A and 4B are views illustrating an example of a lighting apparatus provided by the present disclosure.
Figure 4B:
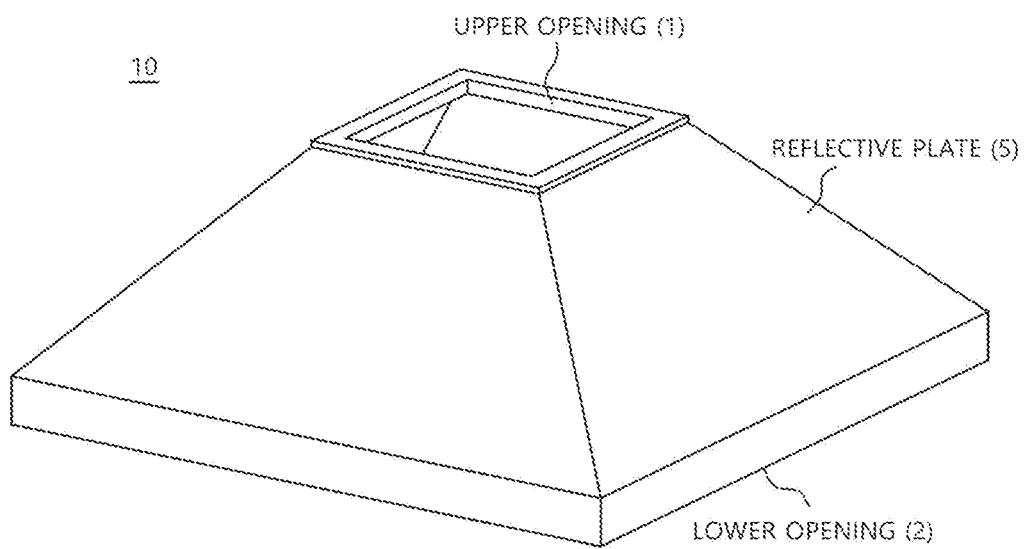

FIGS. 4A and 4B are views illustrating an example of a lighting apparatus provided by the present disclosure.

Referring to FIGS. 4A and 4B, a lighting apparatus 10 provided by the present disclosure may include an upper opening 1, a lower opening 2, a PCB 3, a light source 4, and a plurality of reflective plates 5.

First, the lighting apparatus 10 according to the present disclosure has a square shape having the upper opening 1 having a smaller size than the lower opening 2.

In addition, the plurality of reflective plates 5 each has a flat and circular or polyhedral shape. The lighting apparatus includes the PCB 3 and the light source 4 disposed at any angle and having the openings 1 and 2 at upper and lower sides thereof.

In this case, an LED is mainly used for the light source 4, and a reflector type LED, a lens type LED, a chip type LED, or the like may be used.

FIGS. 4A and 4B illustrate an example of the lighting 10 having four flat reflective plates 5, but the present disclosure is not limited thereto.

The inventor of the present specification has performed optimization through DOE so that the lighting apparatus 10 according to the present disclosure implements square dome lighting that is more compact than and has similar optical properties to the dome lighting.

Specifically, the inventor has limited a reflector height 5' to 50% or less of a dome radius to implement design more compact than the design of the dome lighting in the related art and allowed the upper opening not to hinder a viewing angle of the camera in the F.O.V.

In addition, an input value is selected so that the uniformity in the F.O.V. of 50×50 mm is 90% or more. Further, the input value is selected so that the uniformity in the F.O.V. of 100×100 mm and the value of the light amount may increase as possible.

In addition, light amount ratios for respective incident angles were compared to check whether the distribution of the light amount according to the angle of the light entering the FOV has similar optical properties to the dome lighting in a case in which the uniformity of the FOV of 50 mm×50 mm at the W.D. of 20 mm satisfies the above-mentioned condition.

FIG. 5 illustrates an optimized example of the lighting apparatus illustrated in FIGS. 4A and 4B and having specifications shown in the following Table 1.

TABLE 1

| Total Height | 56.7 mm |
|---|---|
| Reflector Height | 39.5 mm |
| Upper Opening | 50 mm × 50 mm |
| Lower Opening | 160 mm × 160 mm |
| PCB Angle | 60° |

However, the features shown in Table 1 are merely simple optimized examples of the present disclosure and may be implemented in other ways. Hereinafter, the properties and optimized condition of the lighting apparatus 10 provided by the present disclosure will be specifically described with reference to the drawings.

Figure 6B:
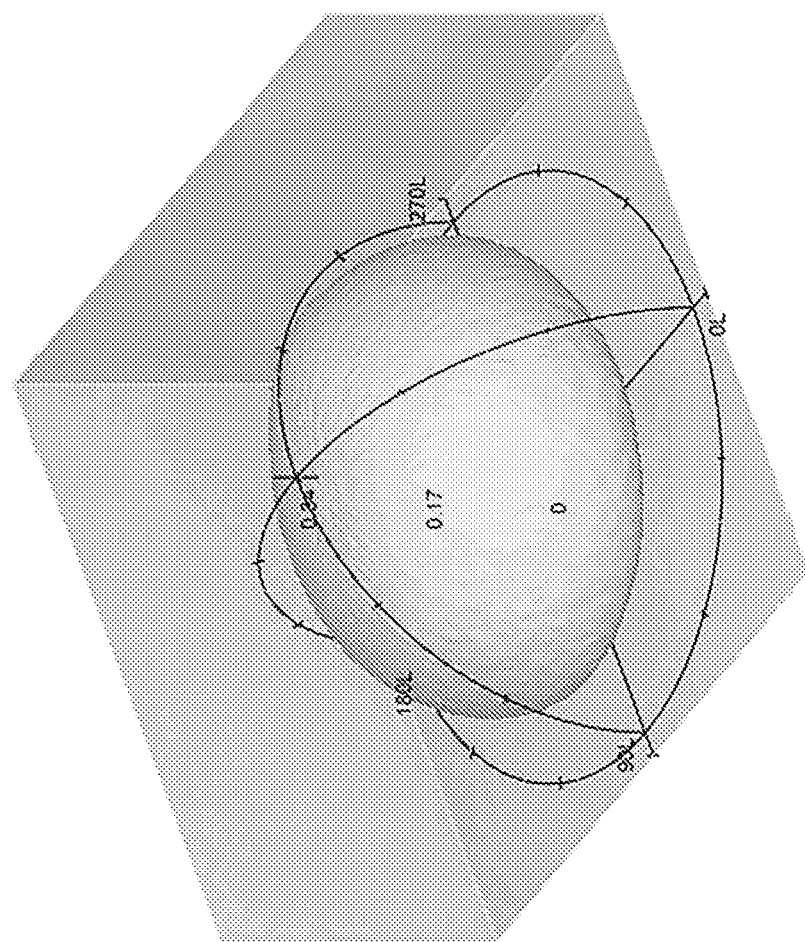
FIGS. 6A and 6B are views illustrating optical properties with respect to physical properties of a reflective plate and other devices related to the present disclosure.
Figure 6A:
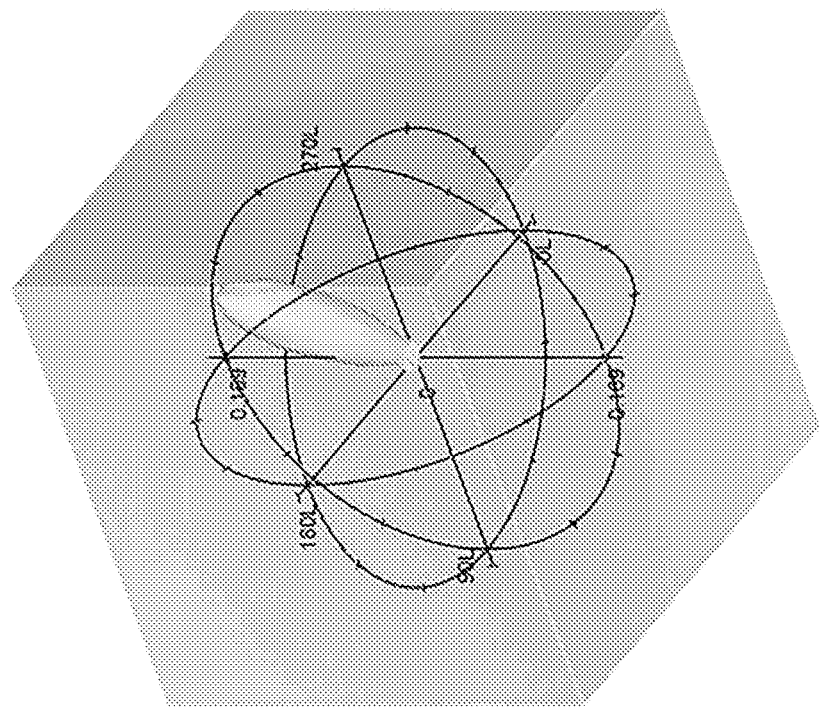

FIGS. 6A and 6B are views illustrating optical properties with respect to physical properties related to the present disclosure when the physical properties of the reflective plate and other devices remain the same.

Referring to FIGS. 6A and 6B, the optical properties with respect to the physical properties were checked on the assumption that the physical properties of the reflective plate and other devices remain the same. One type of Black and two types of White were compared in terms of physical properties.

First, it is assumed that Black has reflectance of 10% or less and the light entering a normal line at 20° is reflected as illustrated in FIG. 6A.

Among the physical properties, one White 1 has reflectance of about 95% but emits light reflected in a Gaussian form similar to the Black. The other White 2 has reflectance of about 85 to 98% but emits light reflected in a Lambertian form as illustrated in FIG. 6B.

In addition, FIG. 7 illustrates an example of a result of physical properties of the devices related to the present disclosure.

For example, when the lighting size is 200 mm and the field of view is 50 mm×50 mm which is ¼ of the lighting size, the optical properties with respect to the physical properties of the reflective plate and the devices for the respective working distances will be described below.

Figure 7A:
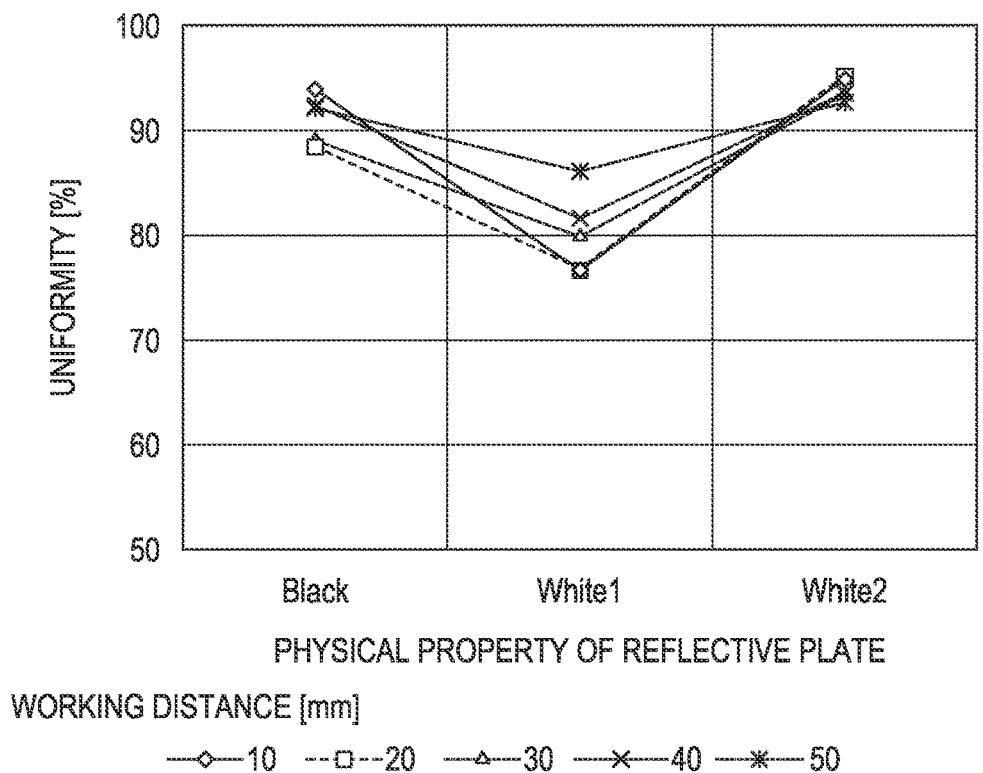
FIGS. 7A and 7B are graphs illustrating an example of a result according to physical properties of the devices related to the present disclosure.

Referring to FIG. 7A, the uniformity of White 2 is 90% or more at all the working distances, and White 2 has a smallest deviation with respect to the working distances.

Black has a better uniformity than White 1 and has a small deviation with respect to the working distances.

Figure 7B:
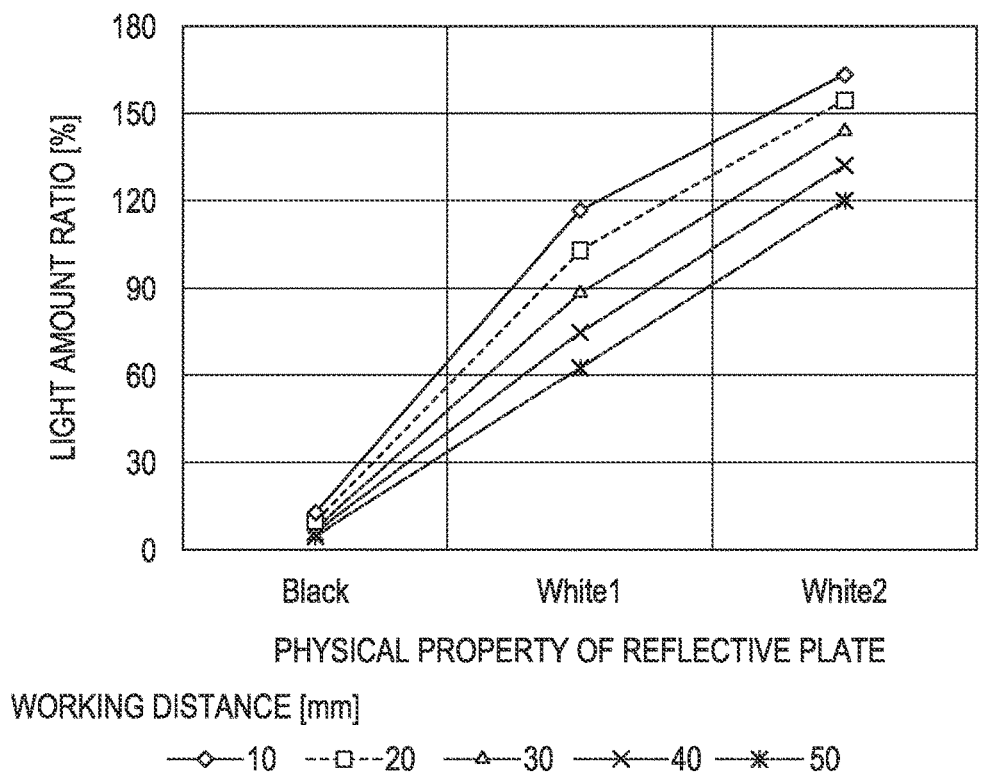

In addition, referring to FIG. 7B, the light amount increases in the order of Black<White 1<White 2, and the light amount decreases as the working distance increases.

FIG. 7B illustrates the light amount ratio when the working distance is 1/10 of the lighting size, i.e., when the light amount of Black is converted into 10 at the position at the W.D. of 20 mm.

Figures 8A, 8B, 8C:
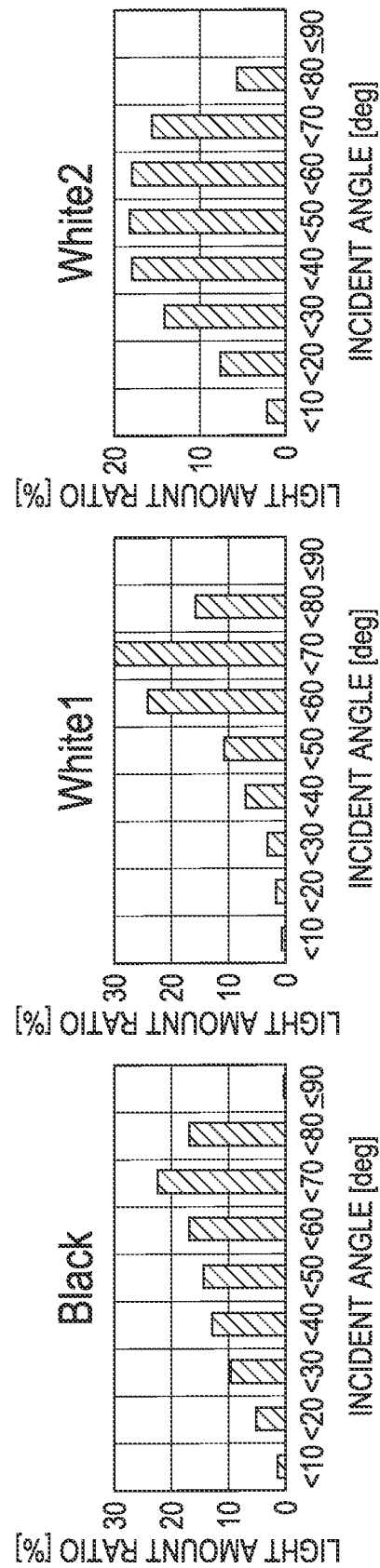
FIGS. 8A to 8C are graphs illustrating a variation of a light amount ratio with respect to incident angles for respective physical properties of the reflective plate and the devices related to the present disclosure.

In addition, FIGS. 8A to 8C are graphs illustrating a variation of a light amount ratio with respect to incident angles for respective physical properties of the reflective plate and the devices related to the present disclosure.

FIG. 8A illustrates Black, FIG. 8B illustrates White 1, and FIG. 8C illustrates White 2 and illustrates the light amount ratio with respect to the incident angle for the respective physical properties of the reflective plate and the devices.

As illustrated in FIG. 8, physical properties of White 2 need to be provided to uniformly emit light.

Figures 9A, 9B, 9C:
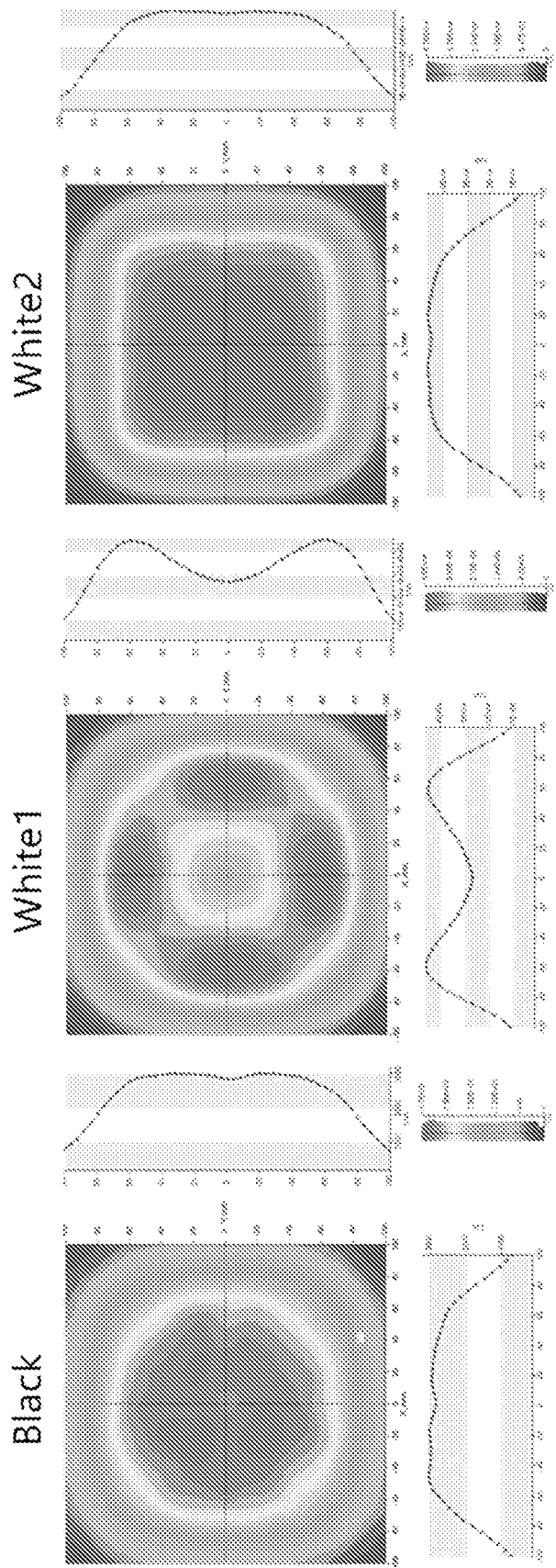
FIGS. 9A to 9C are views illustrating an example light distribution for respective physical properties of the reflective plate and the devices related to the present disclosure.

In addition, FIGS. 9A to 9C are views illustrating an example light distribution for respective physical properties of the reflective plate and the devices related to the present disclosure.

FIG. 9A illustrates Black, FIG. 9B illustrates White 1, FIG. 9C illustrates White 2 and illustrates the light distribution for the respective physical properties of the reflective plate and the devices, and the working distance is 20 mm.

It can be ascertained that White 2, which reflects the light in a Lambertian form, is more appropriate to uniformly emit the light and increase the uniformity and the light amount even though the reflectance is slightly decreased.

Next, a difference in effect according to specific factors will be described and an optimized condition of the present disclosure will be described.

Figure 10A:
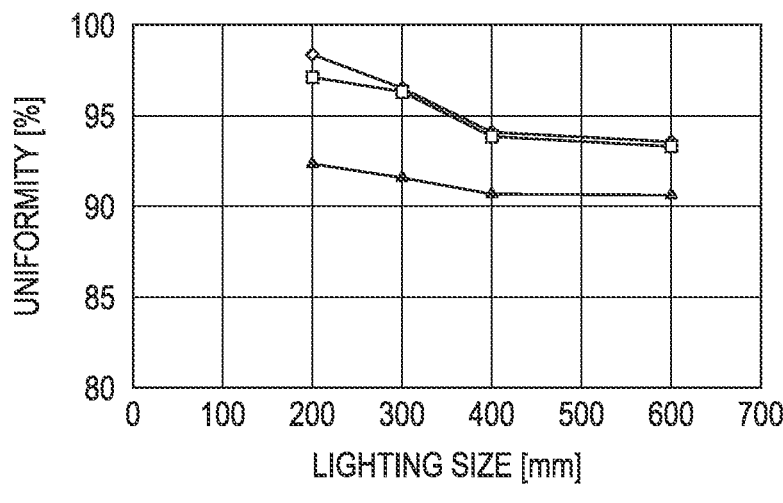
FIGS. 10A to 10C are graphs illustrating variations of uniformity and light amounts with respect to a variation of a lighting size or a reflective plate height related to the present disclosure.
Figure 10B:
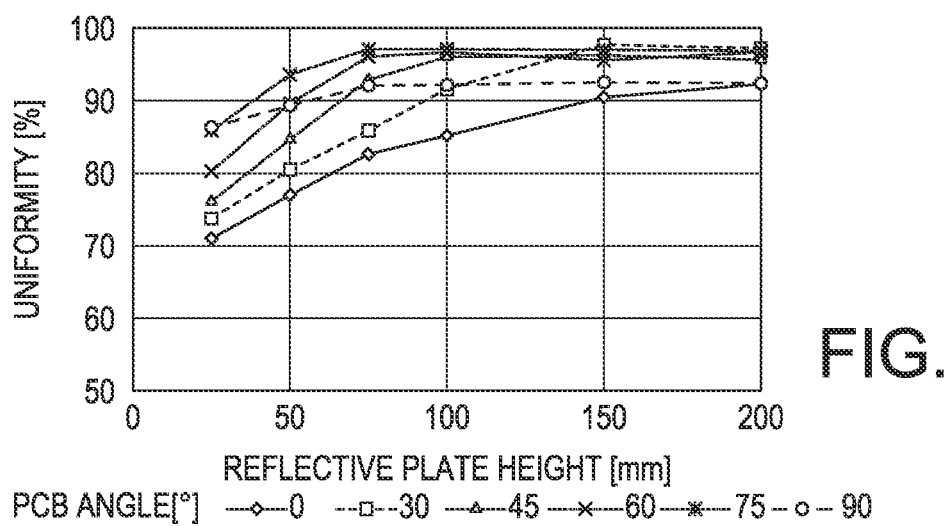
Figure 10C:
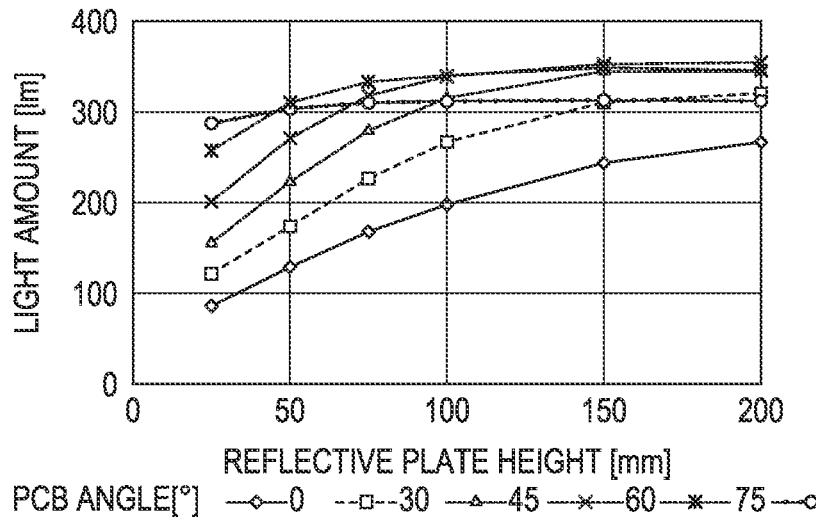

FIGS. 10A to 10C are graphs illustrating variations of uniformity and light amounts with respect to a variation of a lighting size or a reflective plate height related to the present disclosure.

Referring to FIG. 10A, the uniformity with respect to the field of view (lighting size×n, n=¼, ⅓, and ½) decreases as the lighting size increases and the field of view increases when the working distance (lighting size/10) for the respective lighting sizes remains the same.

In addition, referring to FIGS. 10B and 10C, the light uniformity and the light amount of the lighting increase as the reflective plate height increases and the upper opening decreases in size when the lighting size and the PCB angle remain the same.

In addition, the uniformity and the light amount increase as the PCB angle increases. However, this is not the case when the PCB angle is 90 degrees.

Meanwhile, the light amount ratio needs to have normal distribution with respect to the incident angles to softly and uniformly emit light.

FIGS. 11A to 11F are graphs illustrating light amount ratios with respect to incident angles for respective PCB angles related to the present disclosure when the dome lighting is implemented by the four flat reflective plates.

Referring to FIG. 11, the distribution of the light amount ratio with respect to the incident angle varies depending on the PCB angle, and the light amount ratio has distribution most similar to the normal distribution when the PCB angle is 60 degrees.

Figures 12A, 12B, 12C:
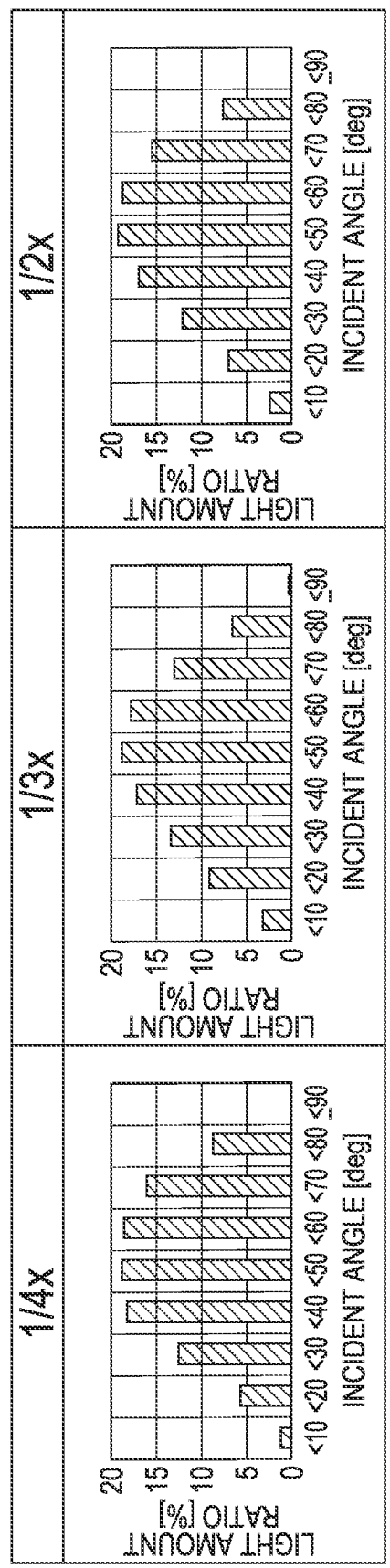
FIGS. 12A to 12C are graphs illustrating light amount ratios with respect to incident angles for respective fields of view related to the present disclosure.

In addition, FIGS. 12A to 12C are graphs illustrating light amount ratios with respect to incident angles for respective fields of view related to the present disclosure.

Referring to FIG. 12, the distribution of the light amount ratio with respect to the incident angle varies depending on the field of view even though the PCB angle and the working distance remain the same. The distribution of the light amount ratio is most similar to the normal distribution when the field of view is ⅓ of the lighting size.

The field of view may be determined based on the following Expression 1.

$$\text{Field of view} = \text{Lighting size} \times n (n=¼, ⅓, ½) \quad \text{Equation 1}$$

Figure 13A:
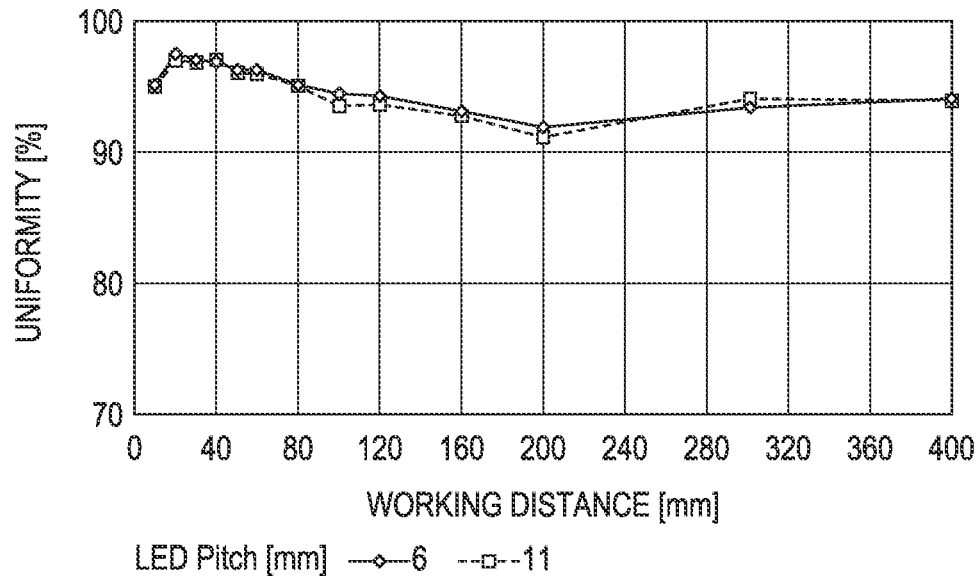
FIGS. 13A and 13B are graphs illustrating variations of uniformity and light amount ratios with respect to working distances related to the present disclosure.
Figure 13B:
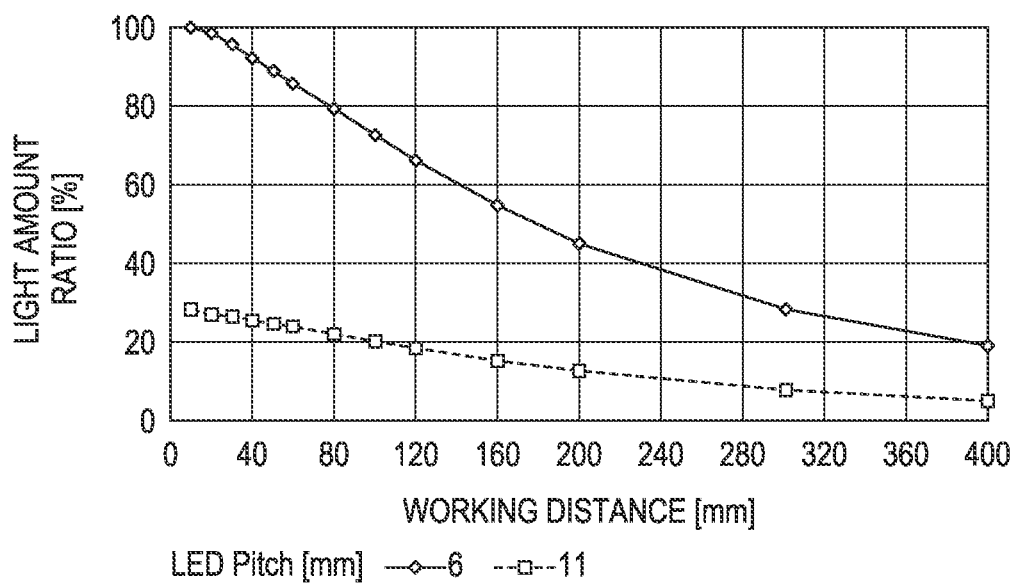

Meanwhile, FIGS. 13A and 13B are graphs illustrating variations of uniformity and light amount ratios with respect to working distances related to the present disclosure.

Referring to FIG. 13, two types of LED pitches were compared to check the optical properties of the lighting according to the LED pitches.

Referring to FIG. 13, the number of LEDs decreases. For example, the lighting size is 400 mm, and the field of view is 100 mm which is ¼ of the lighting size.

In addition, 6 mm and 11 mm are selected as the LED pitches, and the number of LEDs decreases by 27.5% as the LED Pitch increases from 6 mm to 11 mm when the PCB size remains the same.

In addition, it can be ascertained that the uniformity according to the LED pitch has a difference within 1% or less and the light amount is proportional to the number of LEDs (the reference is 100 when the LED pitch is 6 mm and the working distance is 10 mm).

Figure 14A:
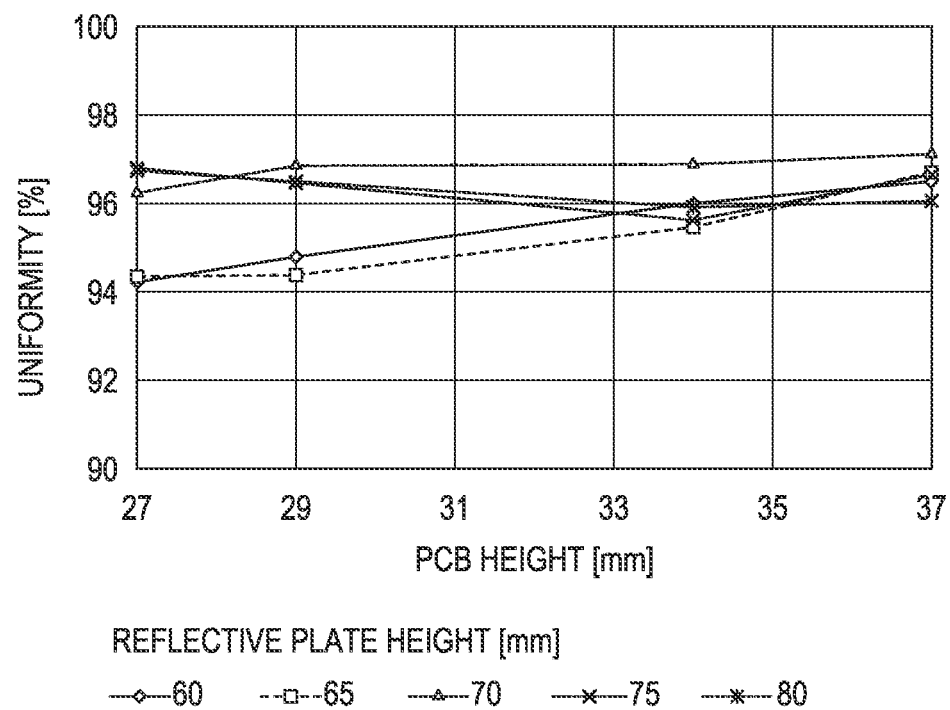
FIGS. 14A and 14B are graphs illustrating variations of uniformity and light amounts with respect to heights of the reflective plate and a PCB related to the present disclosure.
Figure 14B:
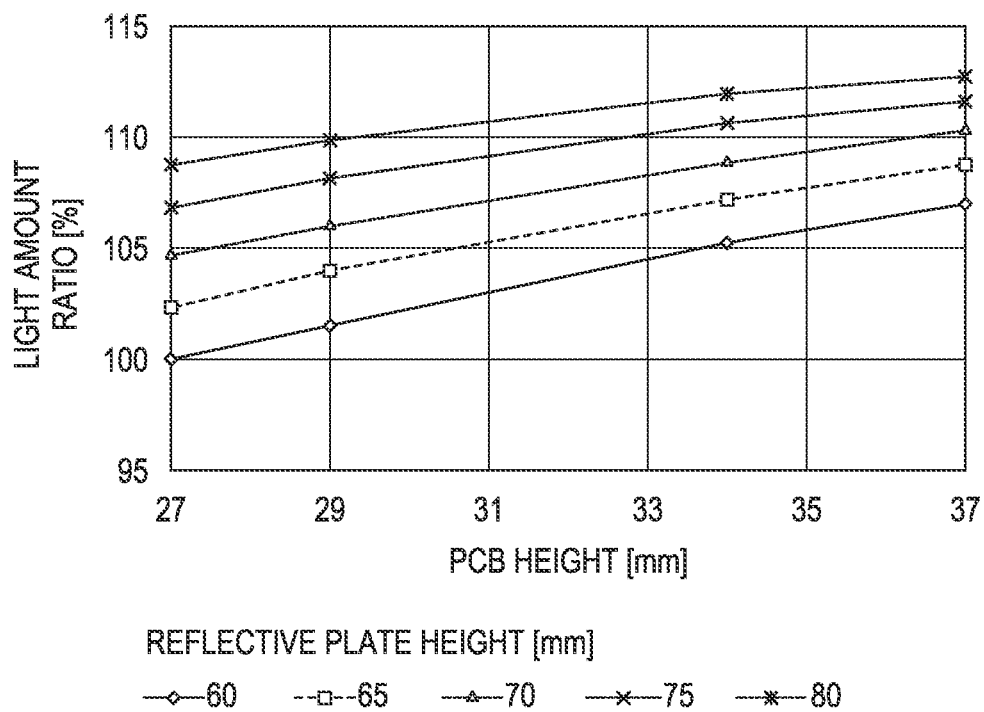

Next, FIGS. 14A and 14B are graphs illustrating a variation of uniformity with respect to heights of the reflective plate and a PCB related to the present disclosure.

As illustrated in FIG. 14, the optical properties of the lighting with respect to the heights of the reflective plate and the PCB are compared and checked.

For example, the lighting size is 400 mm, the PCB angle is 60 degrees, and the field of view is 100 mm which is ¼ of the lighting size.

The working distance shows optical properties of the lighting according to the PCB height at a position (i.e., the W.D. is 40 mm) which is 1/10 of the lighting size.

Referring to FIG. 14A, it can be seen that under the above-mentioned condition, the uniformity increases as the PCB height increases until the reflective plate height increases 70 mm. When the reflective plate height is 75 mm or more, there is a minimum inflection point at which the uniformity increases and then decreases as the PCB height increases. However, the uniformity may vary depending on the working distance or the field of view.

In addition, referring to FIG. 14B, regardless of the field of view or the working distance, the light amount increases as the reflective plate height increases and the PCB height increases.

FIG. 14B is a graph illustrating a light amount ratio made by converting the reflective plate height of 60 mm and the PCB height of 27 mm into the reference (100).

Next, the lighting in the related art and the lighting provided by the present disclosure are compared from various points of view.

FIGS. 15A and 15B are views illustrating an example that structurally compares the dome lighting in the related art and the lighting provided by the present disclosure.

Referring to FIGS. 15A and 15B, the dome lighting in the related art in which the lighting size is equally 200 mm and the PCB angle is 0 degree was compared with the example of the present disclosure in which the PCB angle is 60 degrees.

Referring to FIGS. 15A and 15B, the dome lighting in the related art has a hemispheric shape with a reflective plate height of 95 mm, and the present disclosure has a reflective plate height of 40 mm (20% of the lighting size).

In addition, the present disclosure may implement lightweight and thin design because the height of the reflective plate decreases by 50% or more in comparison with the dome lighting in the related art.

Figure 16A:
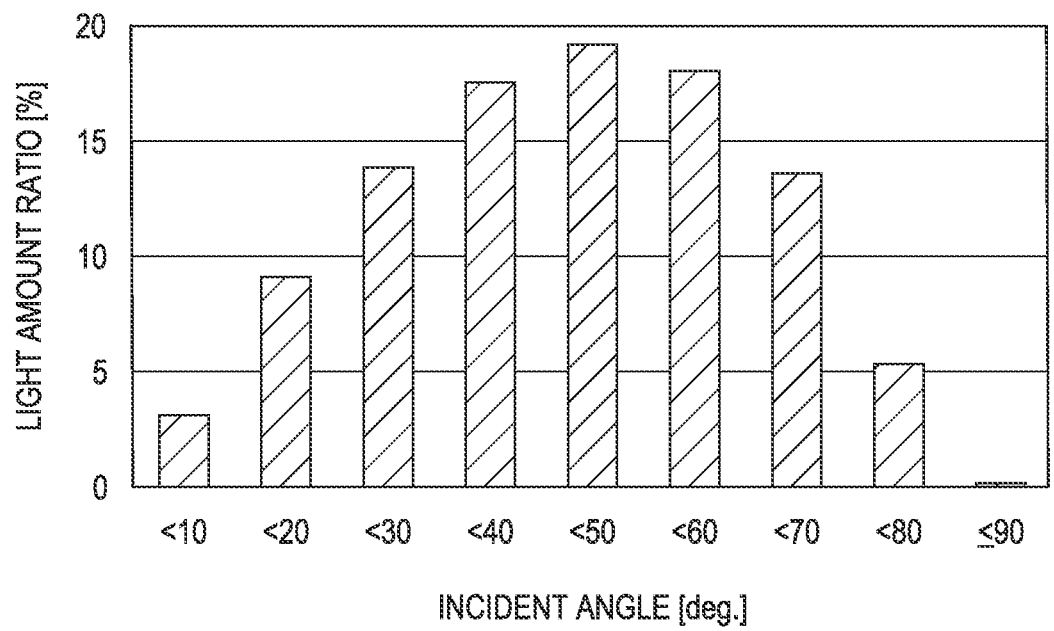
FIGS. 16A and 16B are graphs illustrating an example that compares the dome lighting in the related art and the lighting provided by the present disclosure in terms of light amount ratios with respect to incident angles.
Figure 16B:
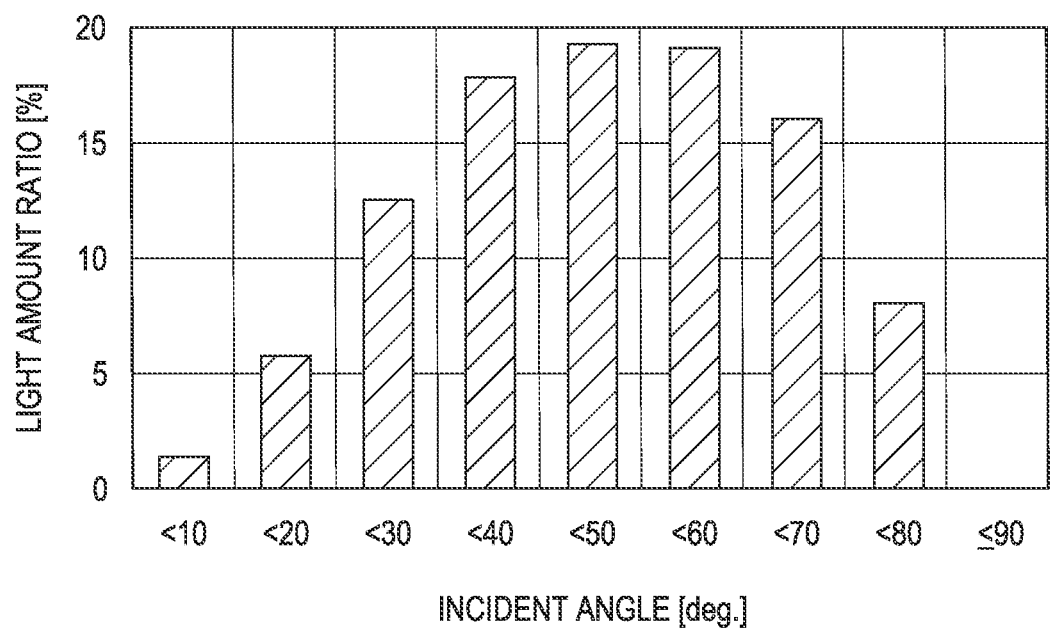

Meanwhile, FIGS. 16A and 16B are graphs illustrating an example that compares the dome lighting in the related art and the lighting provided by the present disclosure in terms of light amount ratios.

FIG. 16A illustrates properties of the dome lighting in the related art, and FIG. 16B illustrates properties of the present disclosure. It can be ascertained that the light may be uniformly emitted because the light amount ratios with respect to the incident angles according to both the dome lighting in the related art and the example of the present disclosure have the distribution similar to the normal distribution as illustrated in the following drawings.

Figures 17A, 17B:
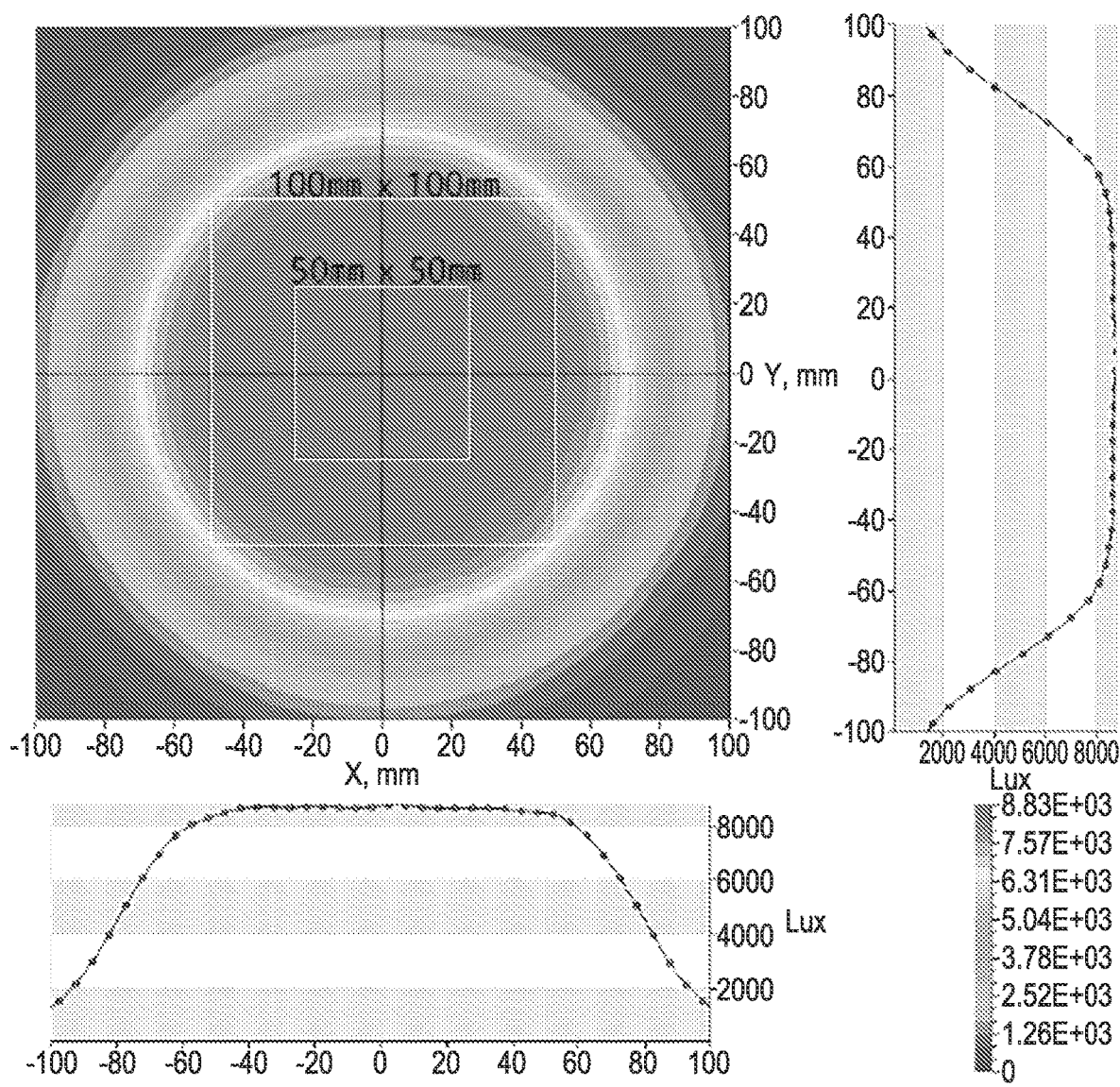
FIGS. 17A to 17C are views illustrating an example that compares the dome lighting in the related art and the lighting provided by the present disclosure in terms of uniformity.
Figure 17C:
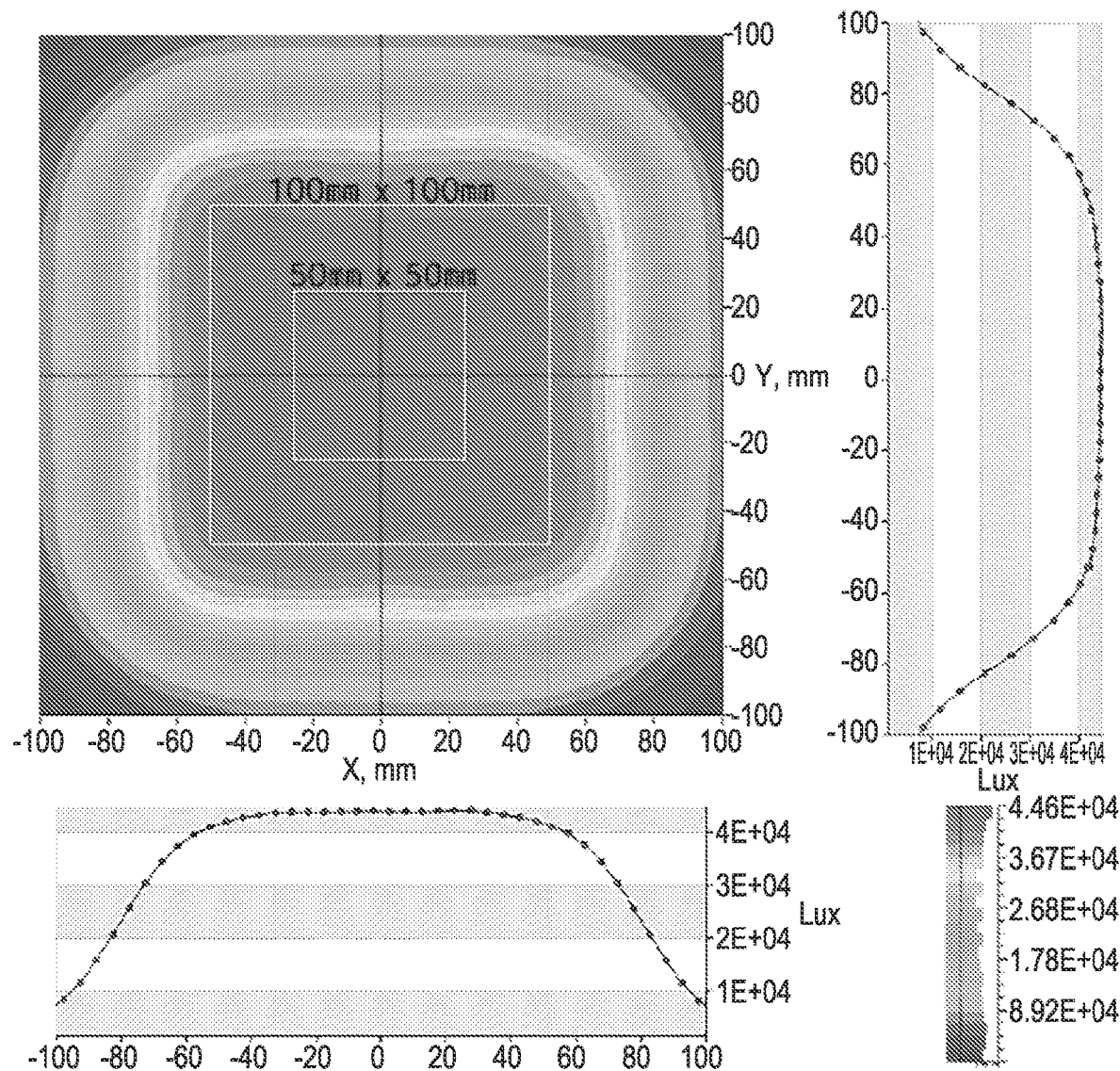

In addition, FIGS. 17A, 17B, and 17C are views illustrating an example that compares the dome lighting in the related art and the lighting provided by the present disclosure in terms of uniformity.

FIG. 17A illustrates fields of view with respect to types of lighting, FIG. 17B illustrates properties of the dome lighting in the related art, and FIG. 17C illustrates properties of the present disclosure. The uniformity was compared when the working distance is 20 mm at a position which is 1/10 of the lighting size. It can be seen that the light according to the present disclosure has better uniformity than the dome lighting in the related art and a difference in uniformity increases as the field of view increases.

Figure 18A:
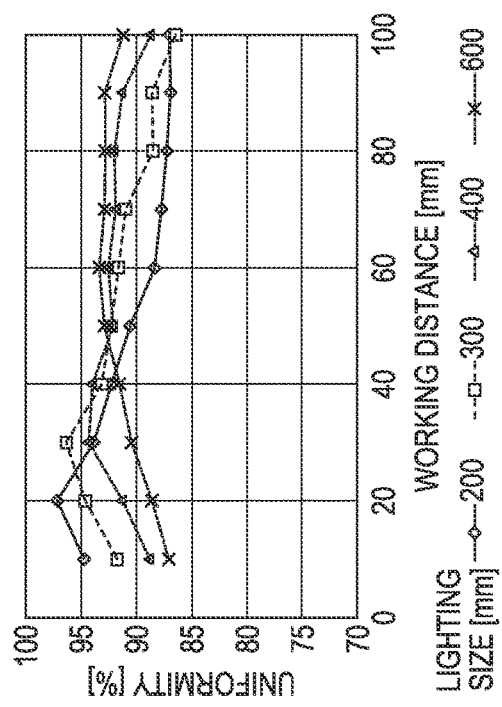
FIGS. 18A to 18C are graphs illustrating a variation of uniformity with respect to the working distance or the field of view according to the present disclosure.
Figure 18B:
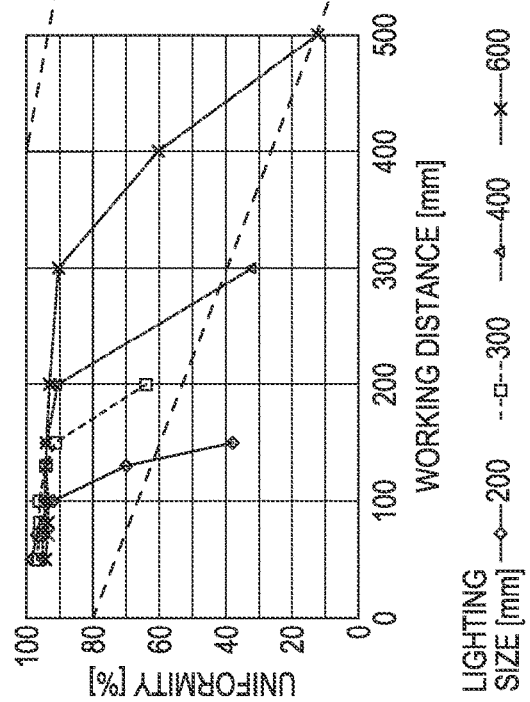
Figure 18C:
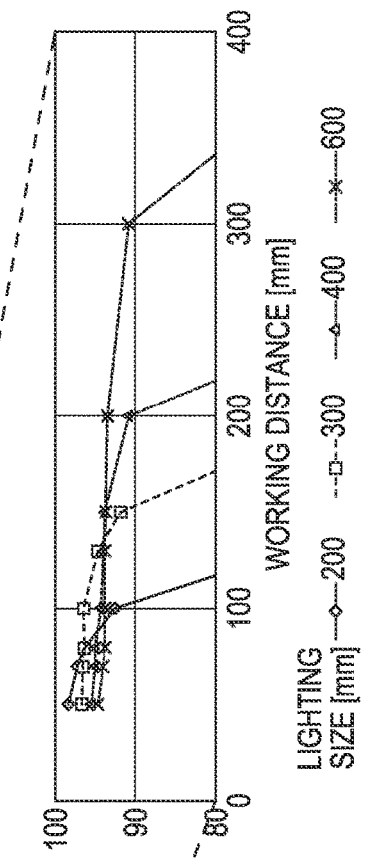

In addition, FIGS. 18A to 18C are graphs illustrating a variation of uniformity with respect to the working distance or the field of view according to the present disclosure.

In the case of the reflective plate having a quadrangular dome shape, the distribution is best when the PCB angle 60±5 degrees to emit soft and uniform light without shadow. The reflective plate height is set to 30% or less of the lighting size to implement lightweight, compact, and thin design.

Referring to FIG. 18A, it can be seen that when the PCB angle is 60 degrees, the reflective plate height is 20% of the lighting size, and the field of view is ⅓ of the lighting size, the uniformity with respect to the working distance is maximum when the working distance is a position of 1/10 of the lighting size.

In addition, referring to FIG. 18B, it can be seen that when the working distance is the position of 1/10 of the lighting size, the uniformity with respect to the field of view is 90% or more when the field of view has a size of ½ or less of the lighting size.

Figure 19:
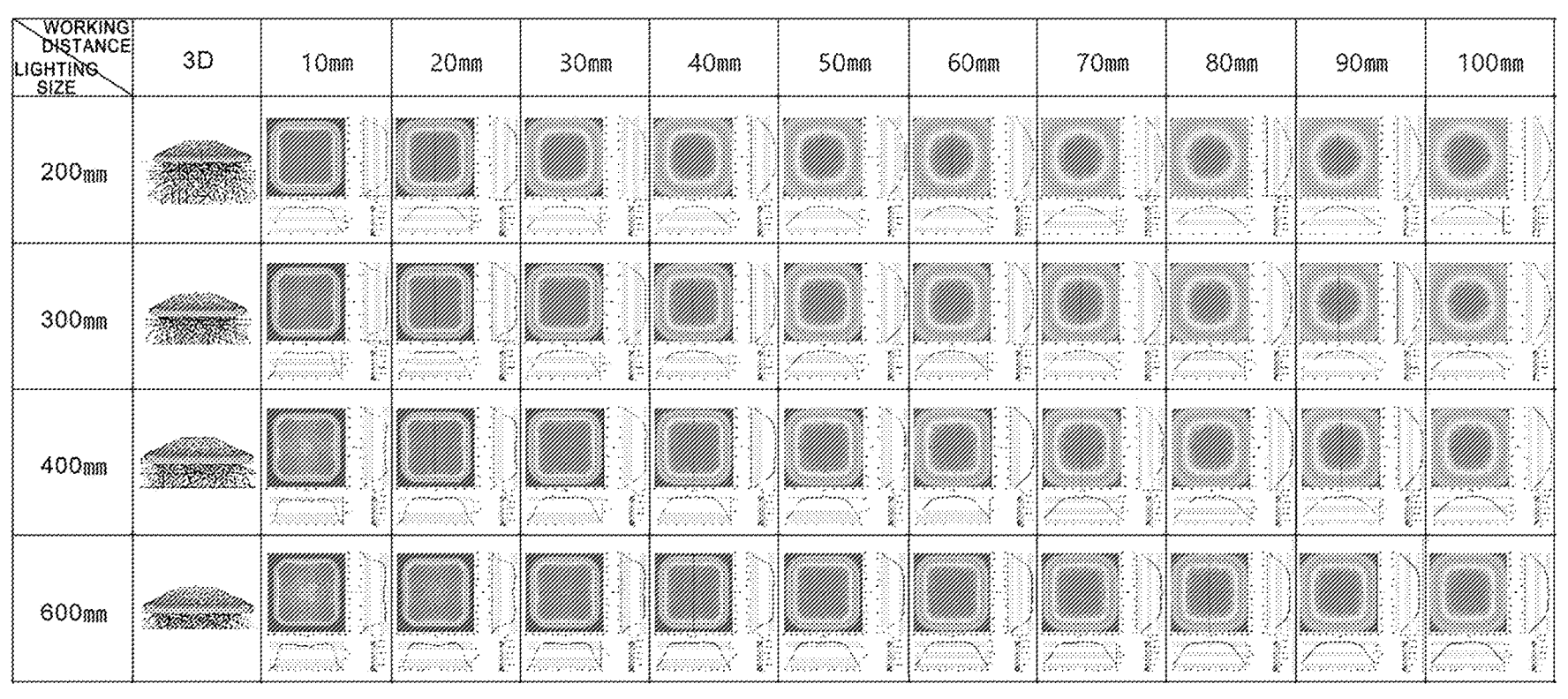

Meanwhile, FIG. 19 is a view illustrating an example of light distribution with respect to the lighting size and the field of view related to the present disclosure when a PCB angle is 60 degrees and a reflective plate height is 20% of the lighting size when the four reflective plates are provided. The present disclosure may be combined with coaxial lighting, ring lighting, bar lighting, and the like in accordance with a test target.

As described above, the lighting apparatus according to the present disclosure is capable of emitting uniform light without shadow to provide soft dome lighting, having lightweight compact, and thin design that saves a space, and obtaining a bright and clear image with a member of a light guide plate even though the dome lighting has a larger size than flat dome lighting.

Therefore, the present disclosure may solve the problem of the dome lighting that there occurs a zone (dark zone), in which an influence of light is decreased due to a size of a lighting hole (opening), and the dome lighting occupies a large space because the dome lighting has a larger volume than other types of lighting.

In addition, the present disclosure may solve the problem of the flat dome lighting that foreign substances included in a light guide diffusion plate cause light-emitting spots, and a pattern of the light guide plate may be visible, which degrades the quality of images.

In addition, the present disclosure may be combined with coaxial lighting, ring lighting, bar lighting, and the like and used in accordance with a test target.

Meanwhile, the effects obtained by the present disclosure are not limited to the aforementioned effects, and other effects, which are not mentioned above, will be clearly understood by those skilled in the art from the following description.

The detailed description of the exemplary embodiments of the present disclosure as described above has been provided to enable those skilled in the art to implement and carry out the present disclosure. While the present disclosure has been described above with reference to the exemplary embodiments, it may be understood by those skilled in the art that the present disclosure may be variously modified and changed without departing from the scope of the present disclosure. For example, those skilled in the art may use the components disclosed in the above-mentioned embodiments by combining the components. Therefore, the present disclosure is not limited to the embodiments disclosed herein but intended to provide the widest scope consistent with the principles and novel features disclosed herein.

The present disclosure may be specified as other specific forms without departing from the spirit and the essential features of the present disclosure. Therefore, it should be appreciated that the detailed description is interpreted as being illustrative in every sense, not restrictive. The scope of the present disclosure should be determined based on the reasonable interpretation of the appended claims, and all of the modifications within the equivalent scope of the present disclosure belong to the scope of the present disclosure. The present disclosure is not limited to the embodiments disclosed herein but intended to provide the widest scope consistent with the principles and novel features disclosed herein. In addition, the embodiments may be configured or new claims may be added by amendments after filing the application by combining claims that do not have explicit relationships therebetween.

What is claimed is:

1. A lighting apparatus comprising:
   a dome structure including a first opening opened in a circular or polygonal shape at least partially in one surface thereof, and a second opening opened in a circular or polygonal shape at least partially in another surface so as to be larger than the first opening;
   a plurality of reflective plates configured to connect at least a part of the first opening and at least a part of the second opening;
   a PCB provided in the dome structure and disposed at a predetermined first angle based on a region of the other surface that excludes the second opening in the other surface of the dome structure; and
   a light source disposed on the PCB,
   wherein light outputted at the first angle from the inside of the dome structure through the light source is reflected through at least one of the plurality of reflective plates, and the reflected light is emitted through the second opening to an object disposed at a lower end of the second opening and spaced apart from the dome structure; and
   wherein the first angle is 55 degrees to 65 degrees and wherein uniformity and a light amount of the light emitted to the object increase in proportion to an increase in size of the first angle and an increase in height of each of the plurality of reflective plates, and a size of the other surface of the dome structure is inversely proportional to uniformity of the light emitted to the object.

2. The lighting apparatus of claim 1, wherein a camera, which is disposed at an upper end of the first opening and spaced apart from the dome structure, captures an image of the object through the first opening and the second opening based on the light emitted to the object.

3. The lighting apparatus of claim 1, wherein the plurality of reflective plates constitutes four or more flat surfaces.

4. The lighting apparatus of claim 1, wherein the light reflected by at least one of the plurality of reflective plates has a Lambertian shape.

5. The lighting apparatus of claim 1, wherein a height of each of the plurality of reflective plates and a height of the PCB are proportional to the light amount of the light emitted to the object, and a size of the other surface of the dome structure is inversely proportional to uniformity of the light emitted to the object.

6. The lighting apparatus of claim 1, wherein a height of each of the plurality of reflective plates is 30% or less of a size of the other surface of the dome structure.

7. The lighting apparatus of claim 1, wherein the lighting apparatus additionally uses at least one of coaxial lighting, ring lighting, and bar lighting depending on the type of object.

8. A lighting apparatus comprising:
   a dome structure including a first opening opened in a circular or polygonal shape at least partially in one surface thereof, and a second opening opened in a circular or polygonal shape at least partially in another surface so as to be larger than the first opening;
   a plurality of reflective plates configured to connect at least a part of the first opening and at least a part of the second opening;
   a PCB provided in the dome structure and disposed at a predetermined first angle based on a region of the other surface that excludes the second opening in the other surface of the dome structure; and
   a light source disposed on the PCB,
   wherein light outputted at the first angle from the inside of the dome structure through the light source is reflected through at least one of the plurality of reflective plates, and the reflected light is emitted through the second opening to an object disposed at a lower end of the second opening and spaced apart from the dome structure; and
   wherein the first angle is 60 degrees, and
   wherein uniformity of the light emitted to the object is 90% or more when a region in which the object is disposed is 50% or less of a size of the other surface; and
   wherein a predetermined reference indicates that a height of each of the plurality of reflective plates is 80 mm when a size of the other surface of the dome structure is 400 mm.

* * * * *